(12) United States Patent
Cooley et al.

(10) Patent No.: US 9,114,732 B2
(45) Date of Patent: Aug. 25, 2015

(54) EASY-ENTRY VEHICLE SEAT

(71) Applicant: Faurecia Automotive Seating, LLC, Troy, MI (US)

(72) Inventors: Thomas J. Cooley, Lapeer, MI (US); Michael P. Miller, South Lyon, MI (US); Donald A. Sharnowski, Novi, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 13/907,151

(22) Filed: May 31, 2013

(65) Prior Publication Data

US 2013/0320729 A1  Dec. 5, 2013

Related U.S. Application Data

(60) Provisional application No. 61/654,760, filed on Jun. 1, 2012.

(51) Int. Cl.
| | |
|---|---|
| *A47C 1/00* | (2006.01) |
| *A61G 15/00* | (2006.01) |
| *B60N 2/00* | (2006.01) |
| *B60N 2/02* | (2006.01) |
| *B60N 2/06* | (2006.01) |
| *B60N 2/12* | (2006.01) |
| *B60N 2/04* | (2006.01) |
| *B60N 2/20* | (2006.01) |
| *B60N 2/22* | (2006.01) |
| *B60N 2/30* | (2006.01) |

(52) U.S. Cl.
CPC ...... *B60N 2/06* (2013.01); *B60N 2/065* (2013.01); *B60N 2/12* (2013.01); *B60N 2/305* (2013.01); *B60N 2/02* (2013.01); *B60N 2/04* (2013.01); *B60N 2/20* (2013.01); *B60N 2/22* (2013.01); *B60N 2/3002* (2013.01)

(58) Field of Classification Search
CPC .............. B60N 2/02; B60N 2/12; B60N 2/20; B60N 2/04; B60N 2/22; B60N 2/3002
USPC ............ 297/331–336, 340, 344.11, 313, 341, 297/378.12
See application file for complete search history.

(56) References Cited

U.S. PATENT DOCUMENTS

| | | | | |
|---|---|---|---|---|
| 4,408,798 | A * | 10/1983 | Mizushima et al. | 297/326 |
| 5,529,378 | A * | 6/1996 | Chaban et al. | 297/331 |
| 5,927,809 | A * | 7/1999 | Tame | 297/341 |
| 6,010,190 | A * | 1/2000 | Downey | 297/340 |
| 6,152,533 | A * | 11/2000 | Smuk | 297/341 |
| 7,350,867 | B2 * | 4/2008 | Park | 297/378.12 |
| 8,376,459 | B2 * | 2/2013 | Kumazaki et al. | 297/341 |

(Continued)

*Primary Examiner* — Chi Q Nguyen

(74) *Attorney, Agent, or Firm* — Reising Ethington P.C.

(57) ABSTRACT

A passenger support includes a vehicle seat and an easy-entry motion controller. The vehicle seat is moveable between a passenger-use configuration and an easy-entry configuration. The easy-entry motion controller controls movement of the vehicle seat between the passenger-use configuration and the easy-entry configuration, including movement of a seat back between an occupant-use position and a tilted-forward position, movement of a seat bottom between an occupant-use position and a folded-up position, and movement of a seat base between a rearward position and a forward position. The passenger support thus provides enhanced access to other areas of the vehicle, such as passenger supports located therebehind.

20 Claims, 27 Drawing Sheets

(56) References Cited

U.S. PATENT DOCUMENTS

| | | | |
|---|---|---|---|
| 8,585,145 B2 * | 11/2013 | Nock et al. | 297/341 |
| 8,727,442 B2 * | 5/2014 | Runde | 297/378.12 |
| 2008/0122279 A1 * | 5/2008 | Park | 297/332 |
| 2011/0198906 A1 * | 8/2011 | Wojatzki et al. | 297/344.11 |
| 2013/0200673 A1 * | 8/2013 | Rdzanek et al. | 297/313 |

* cited by examiner

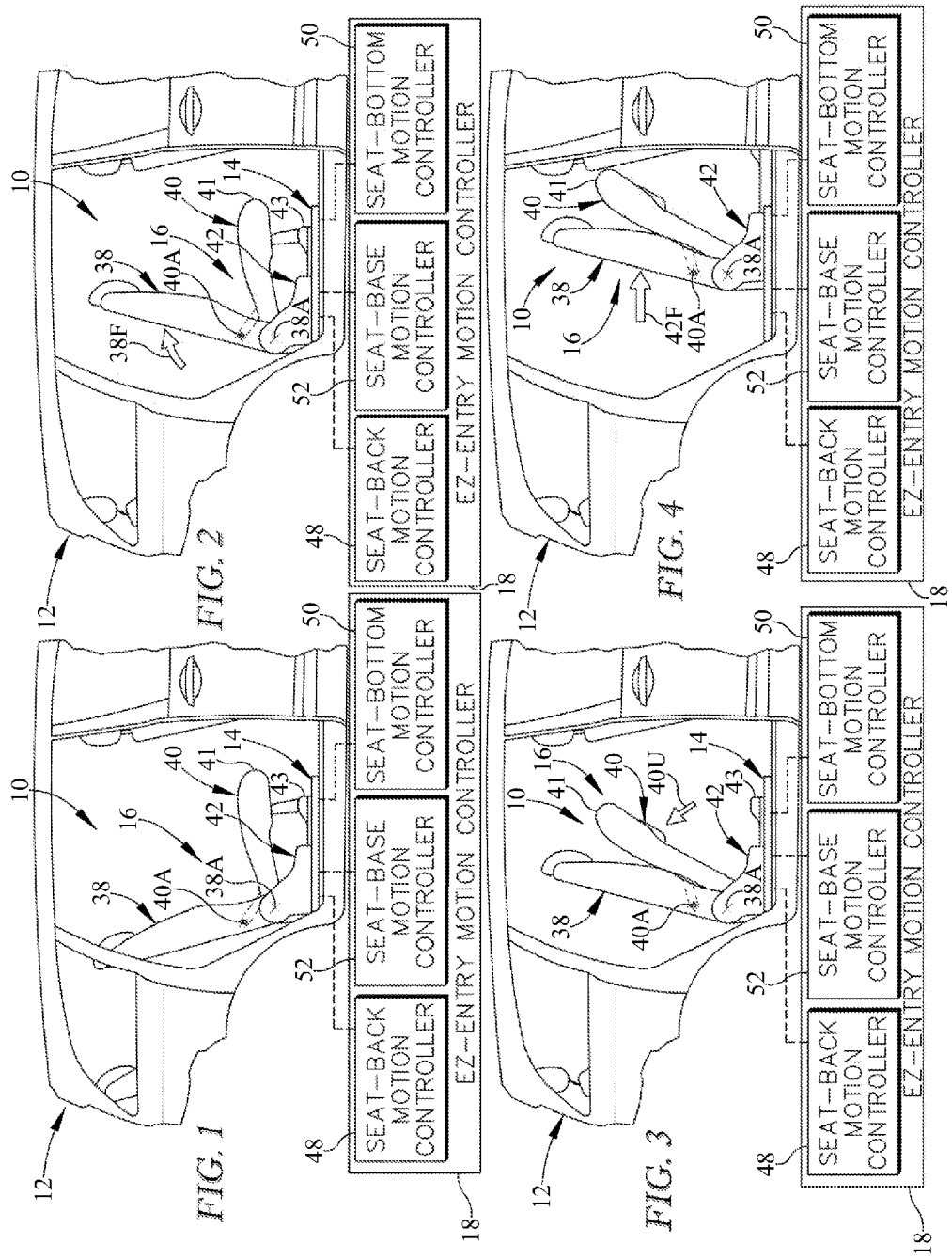

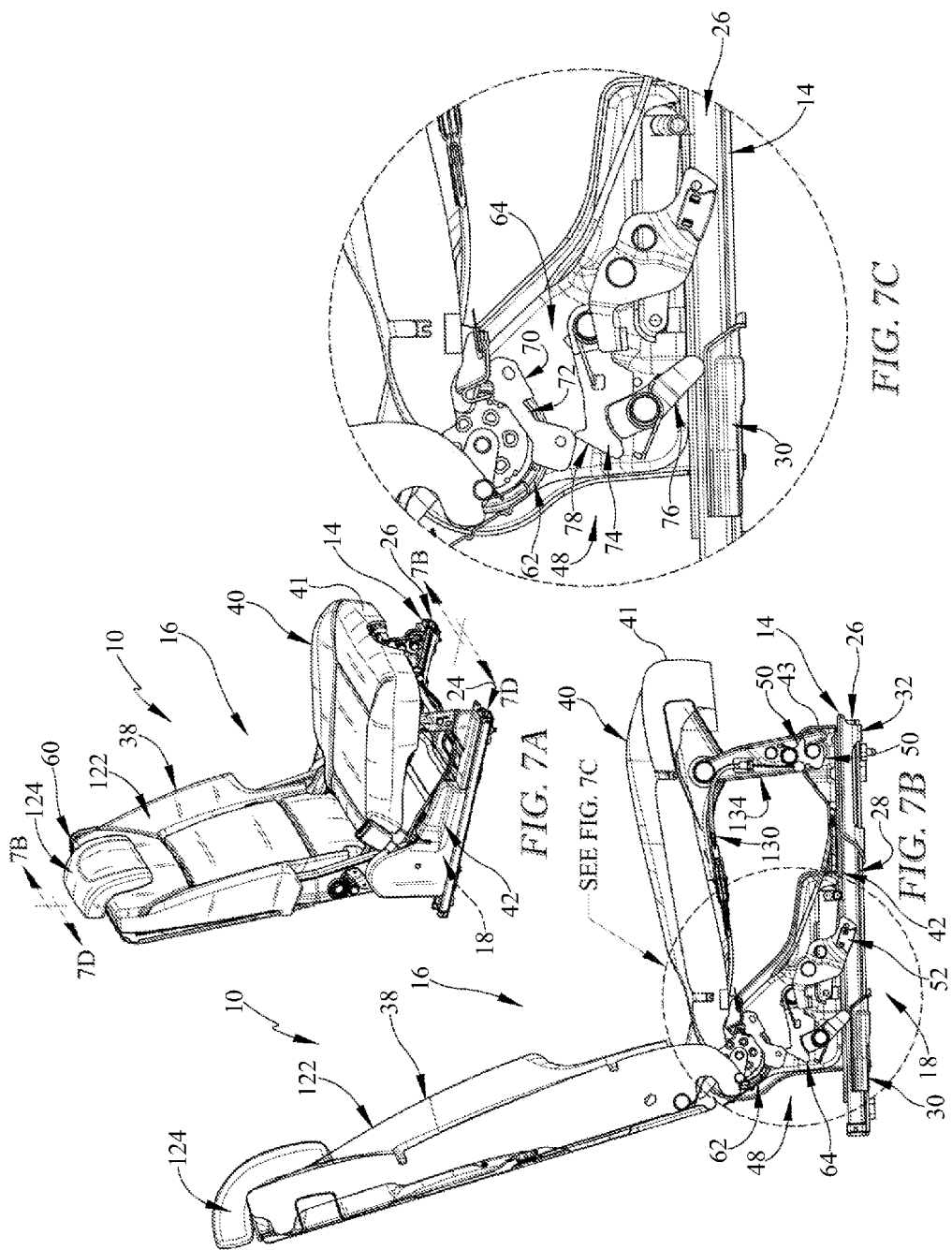

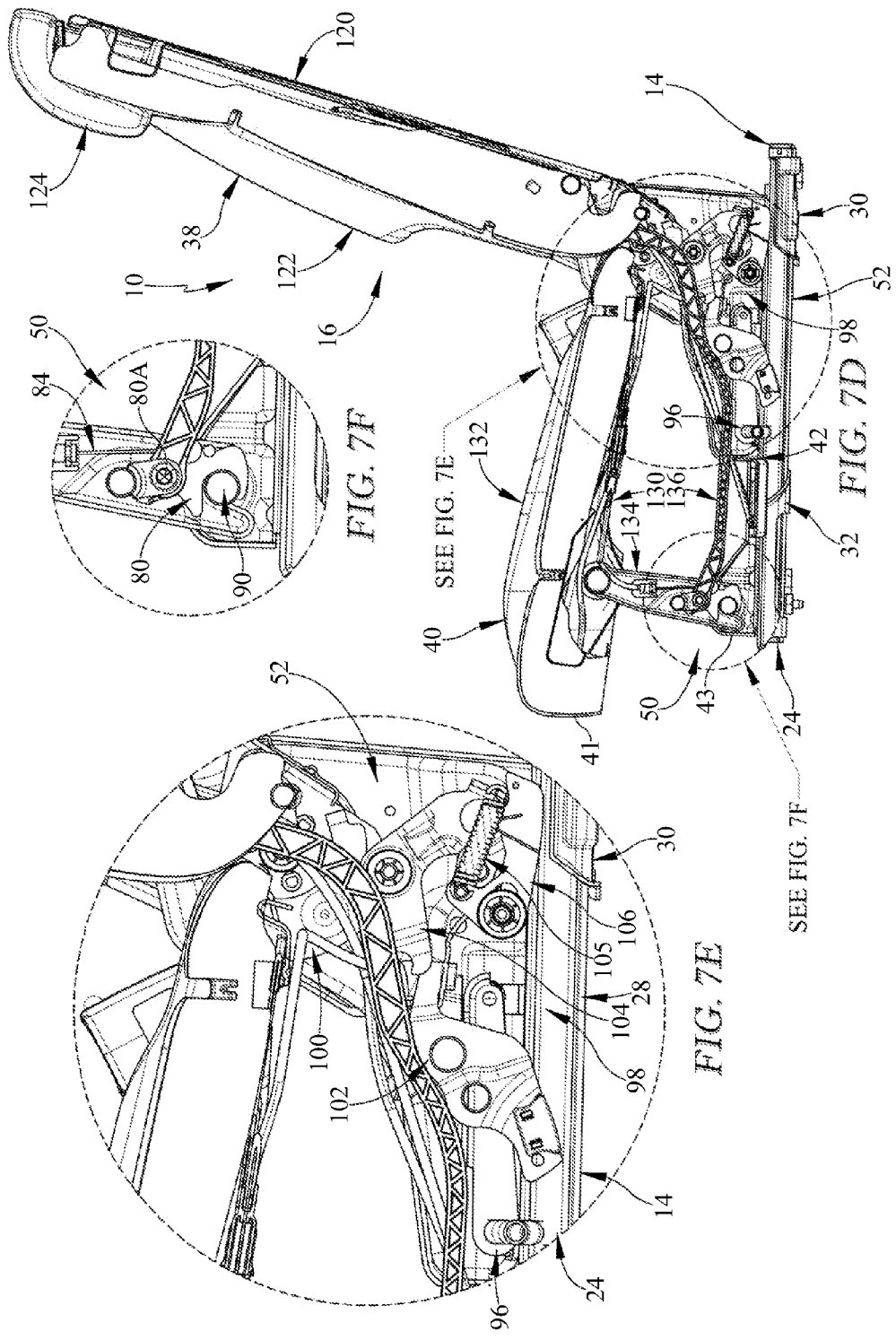

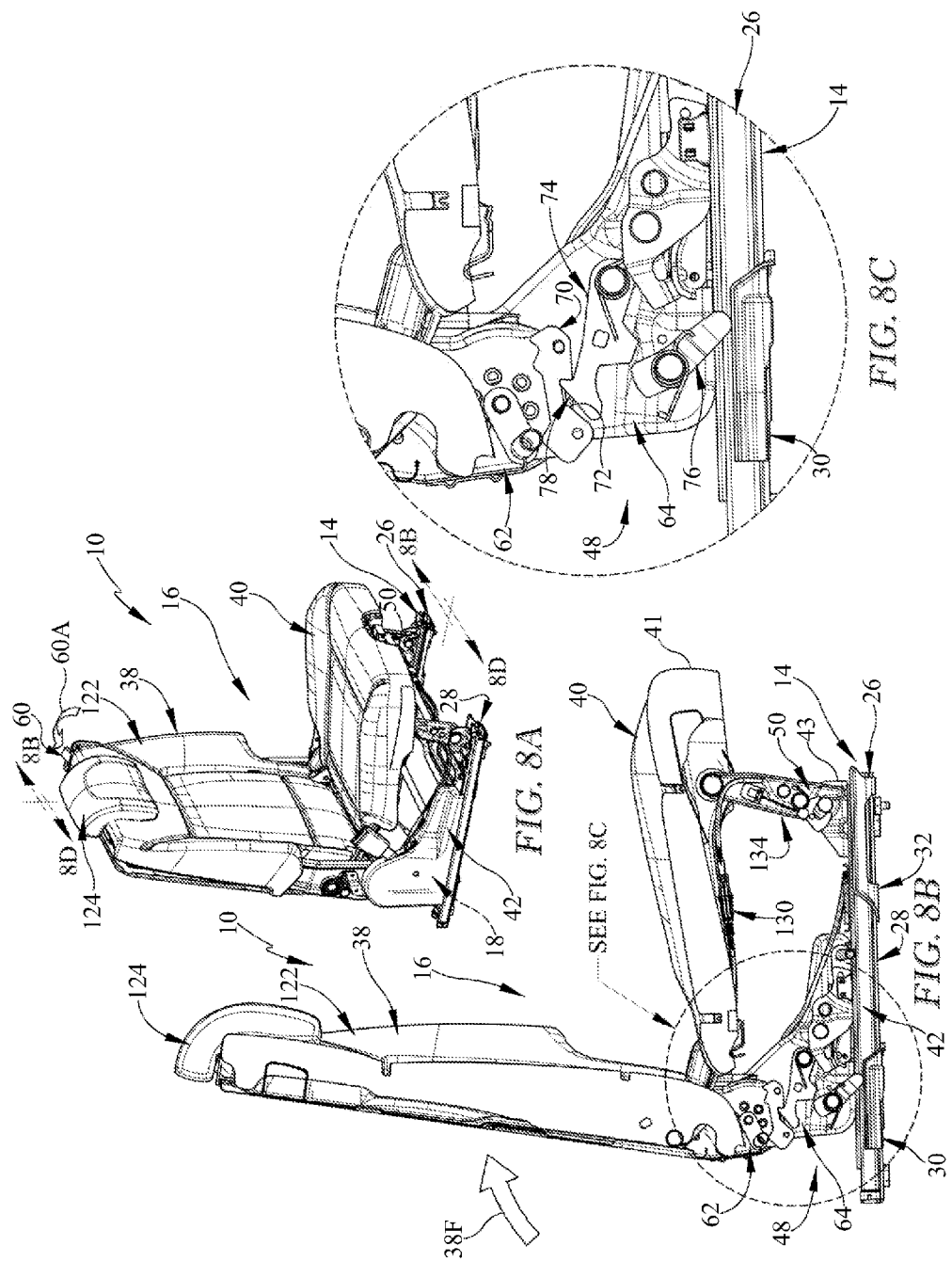

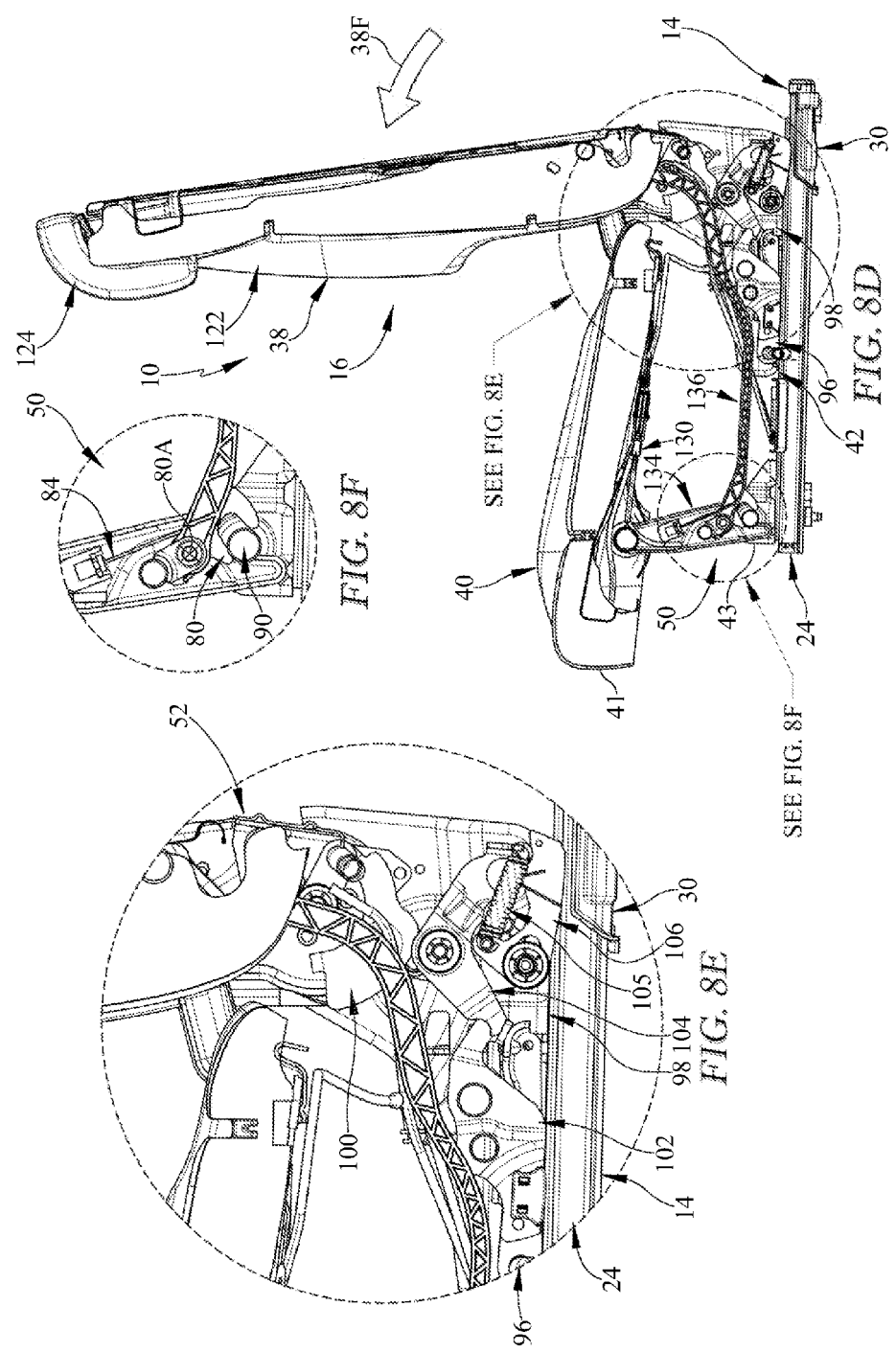

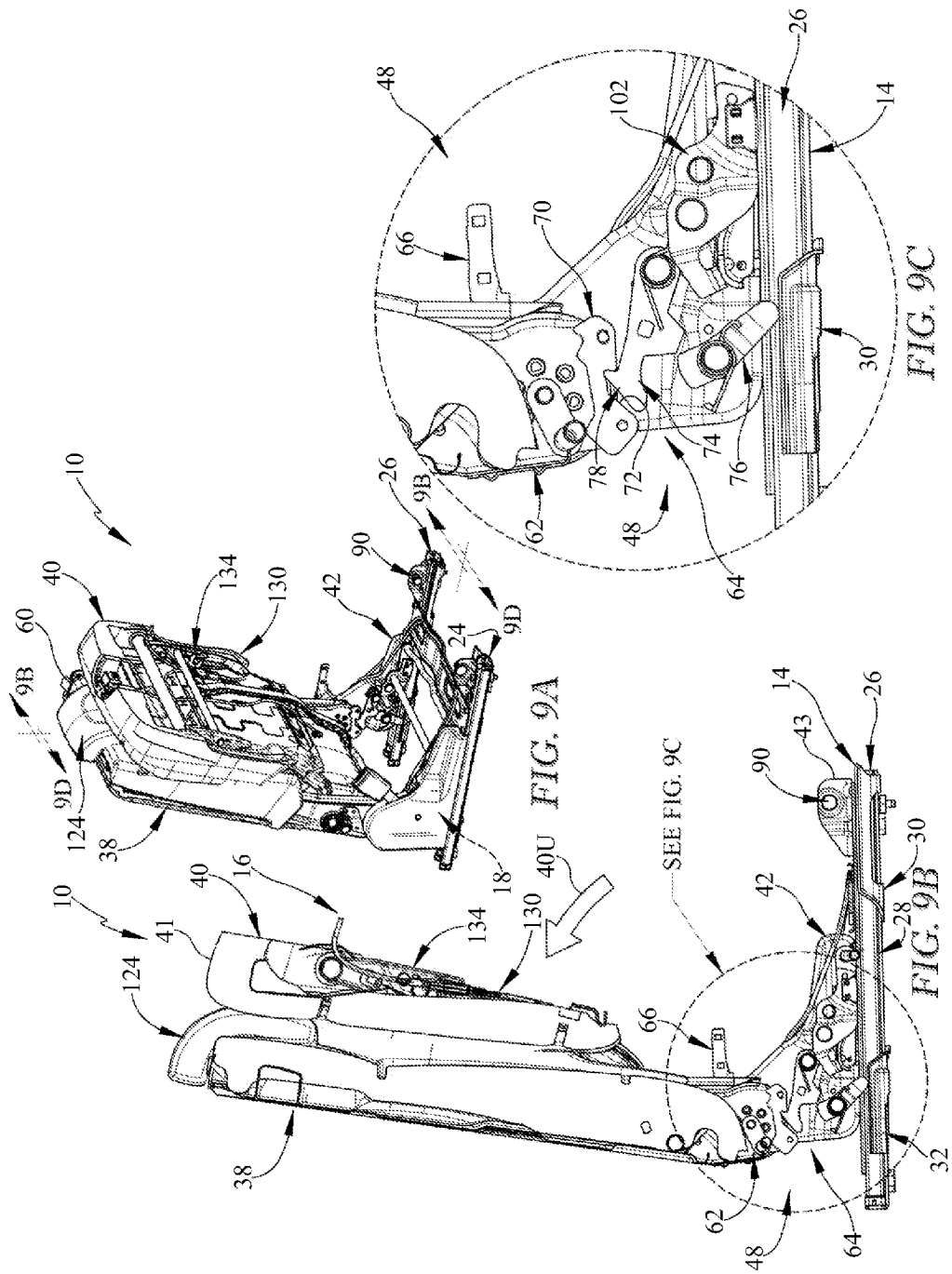

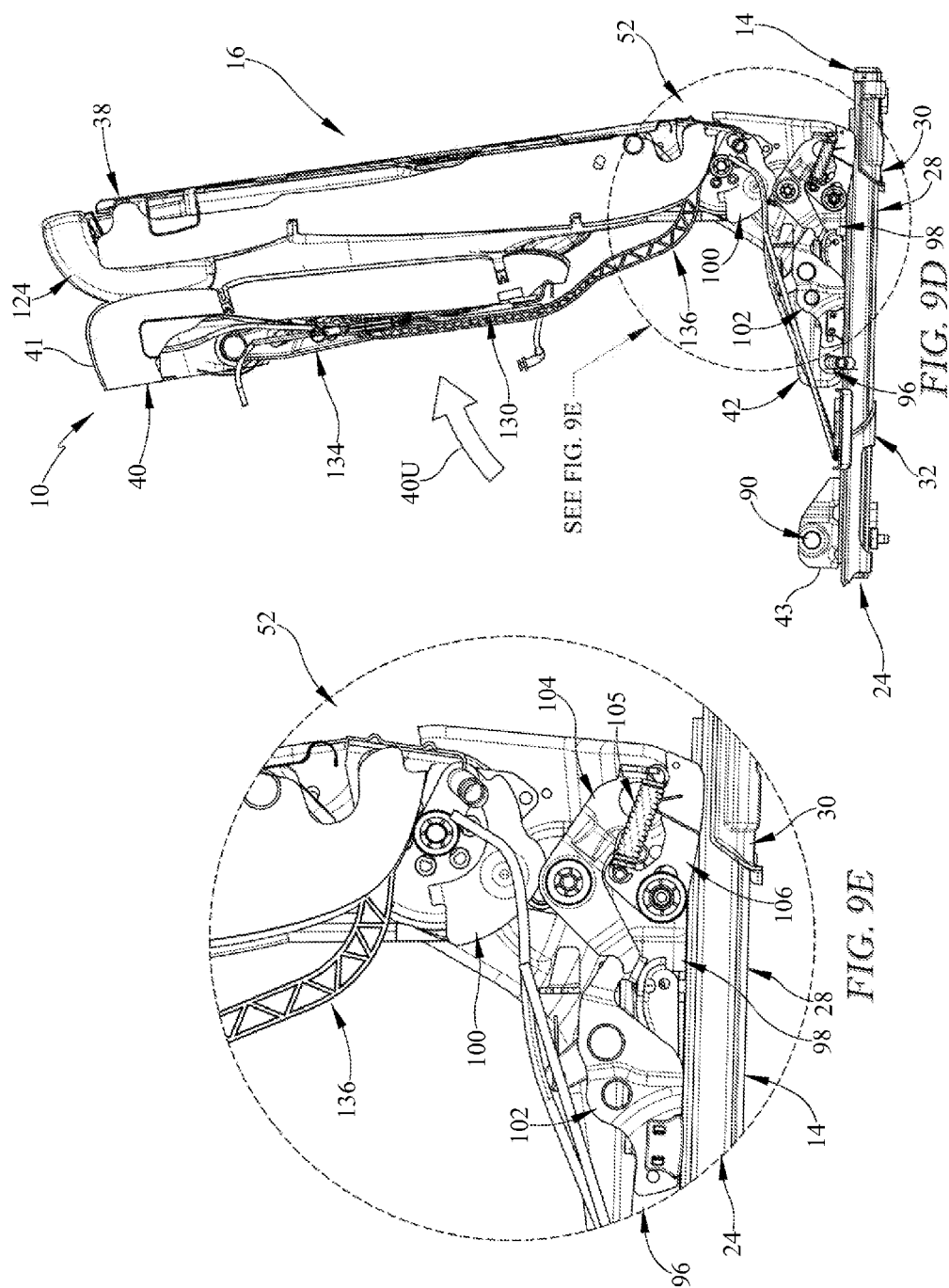

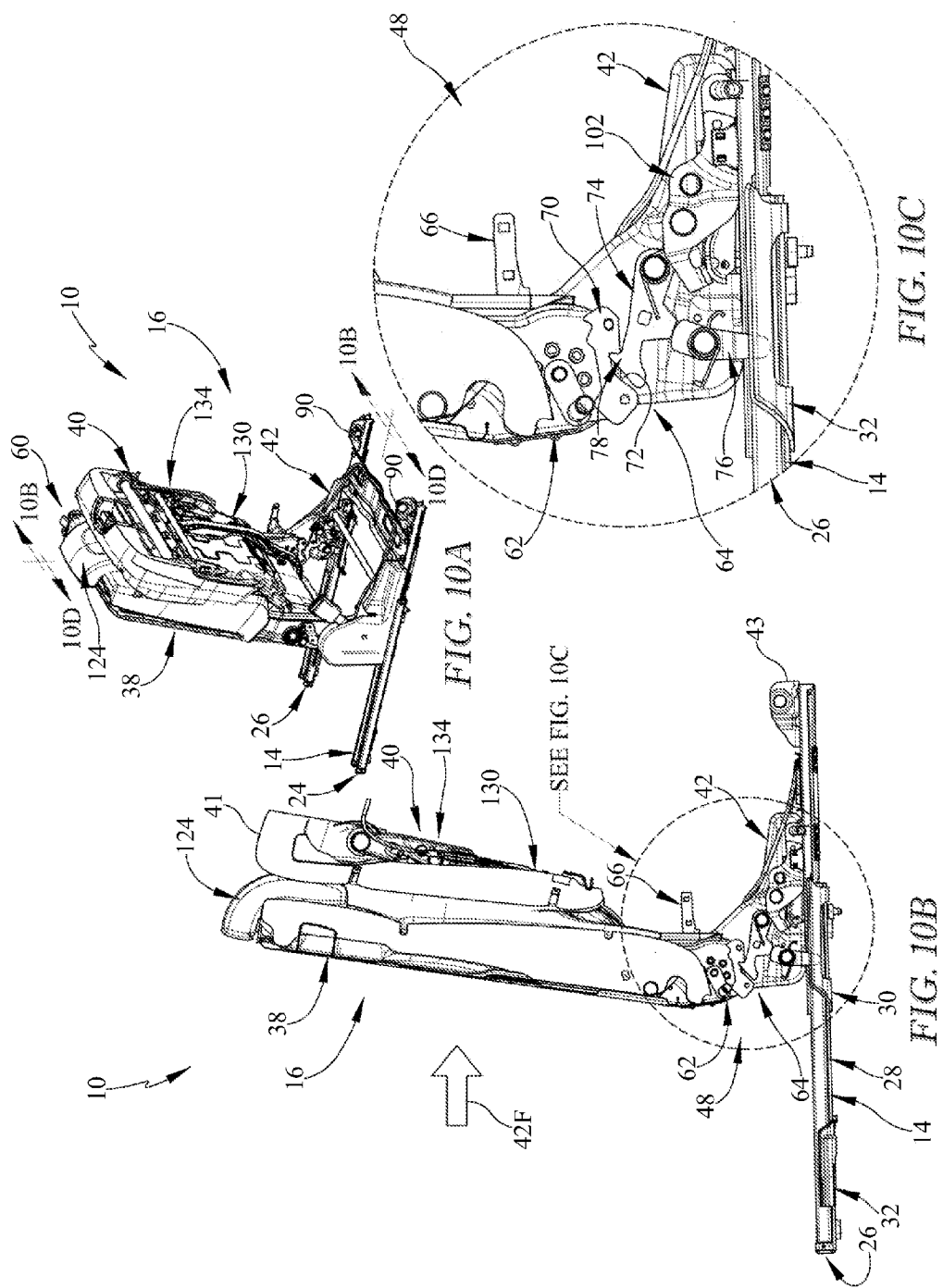

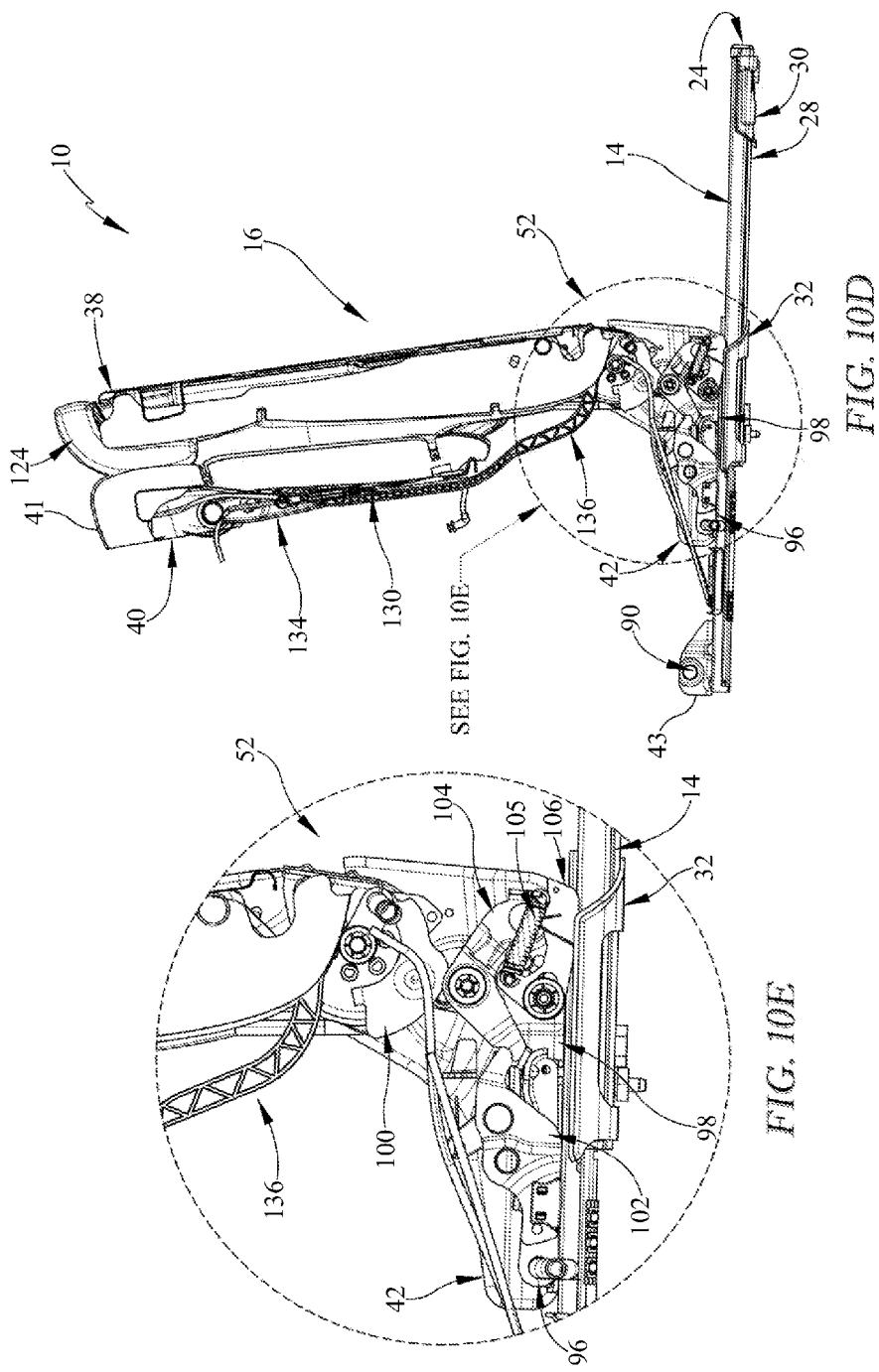

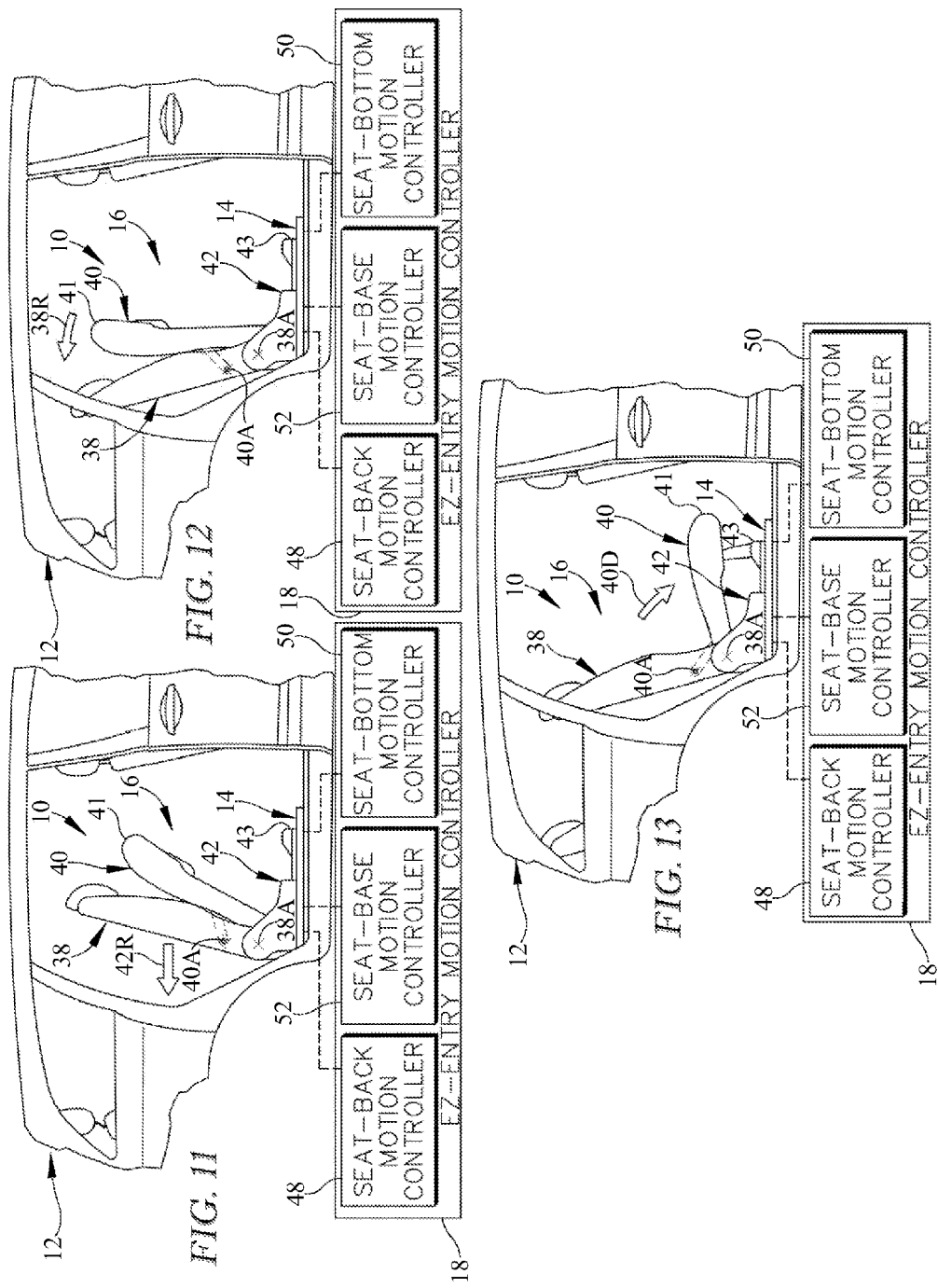

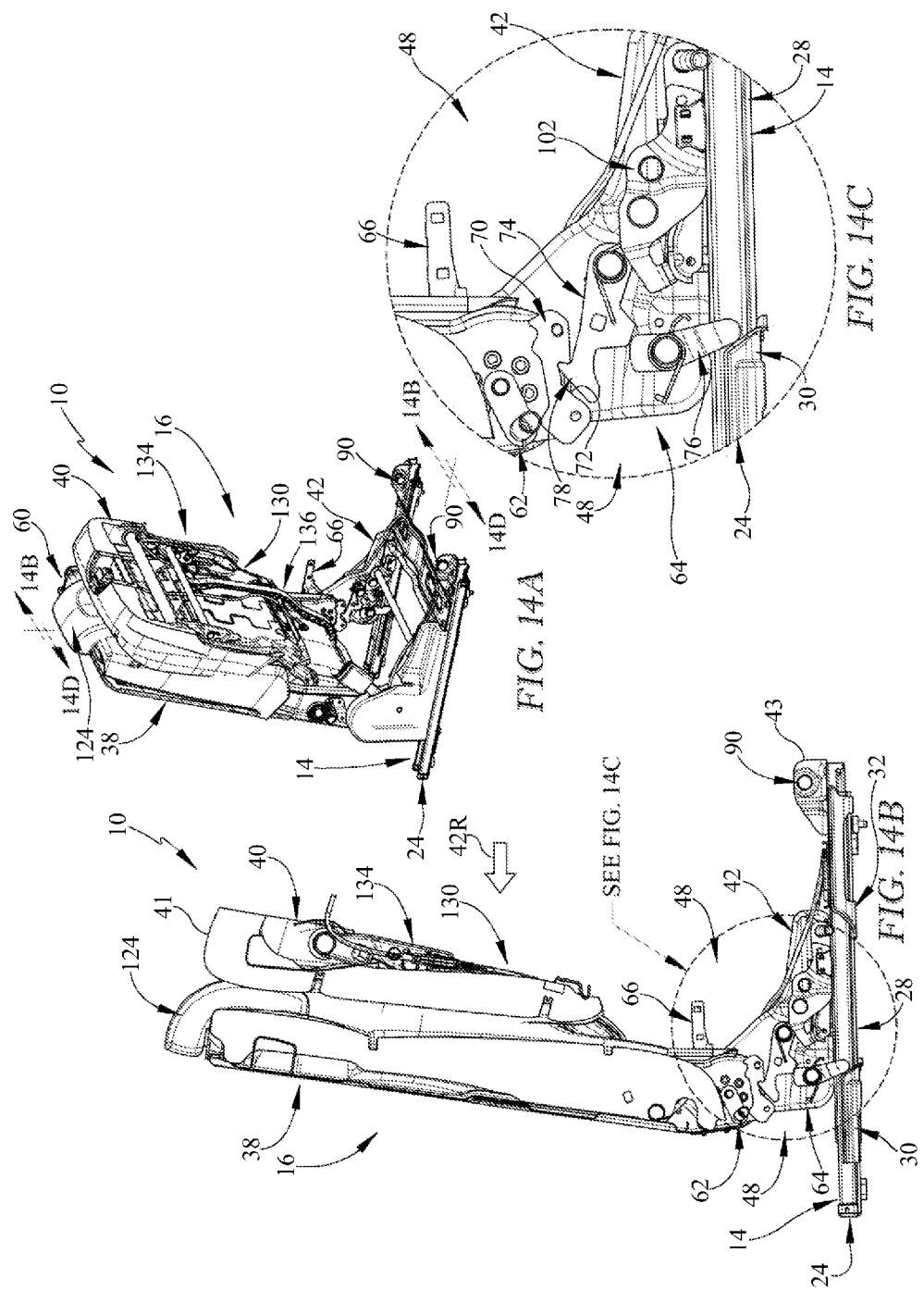

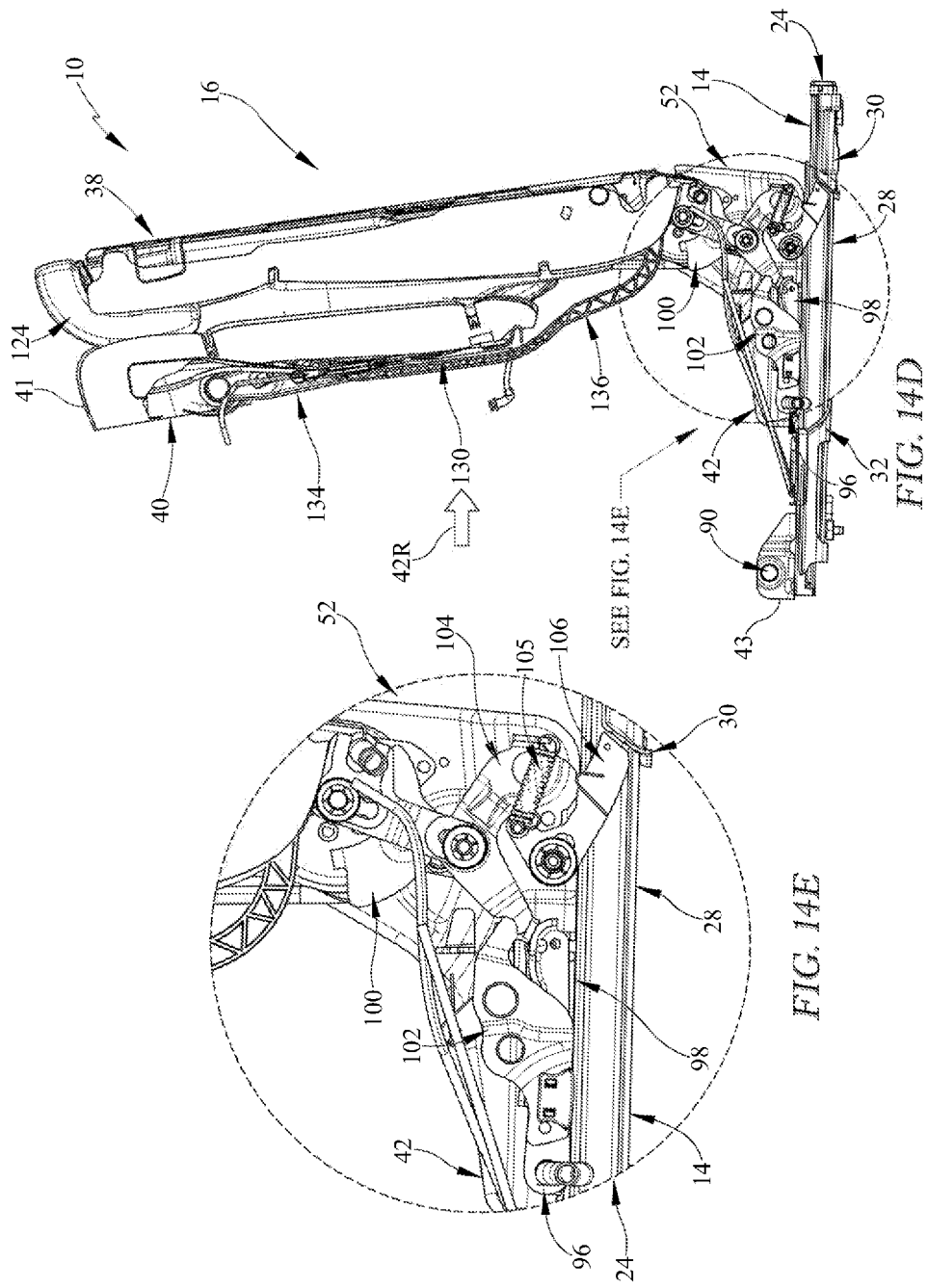

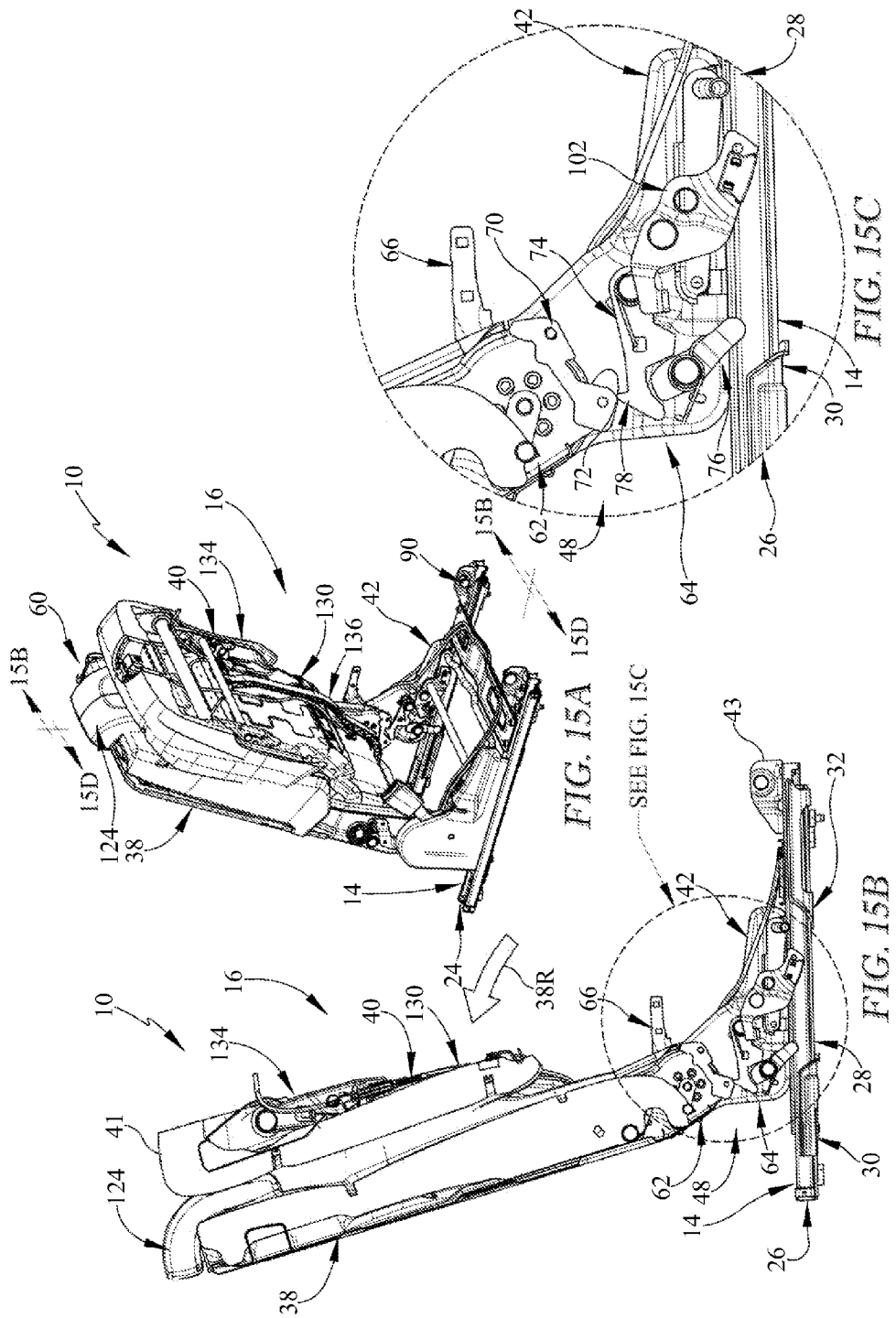

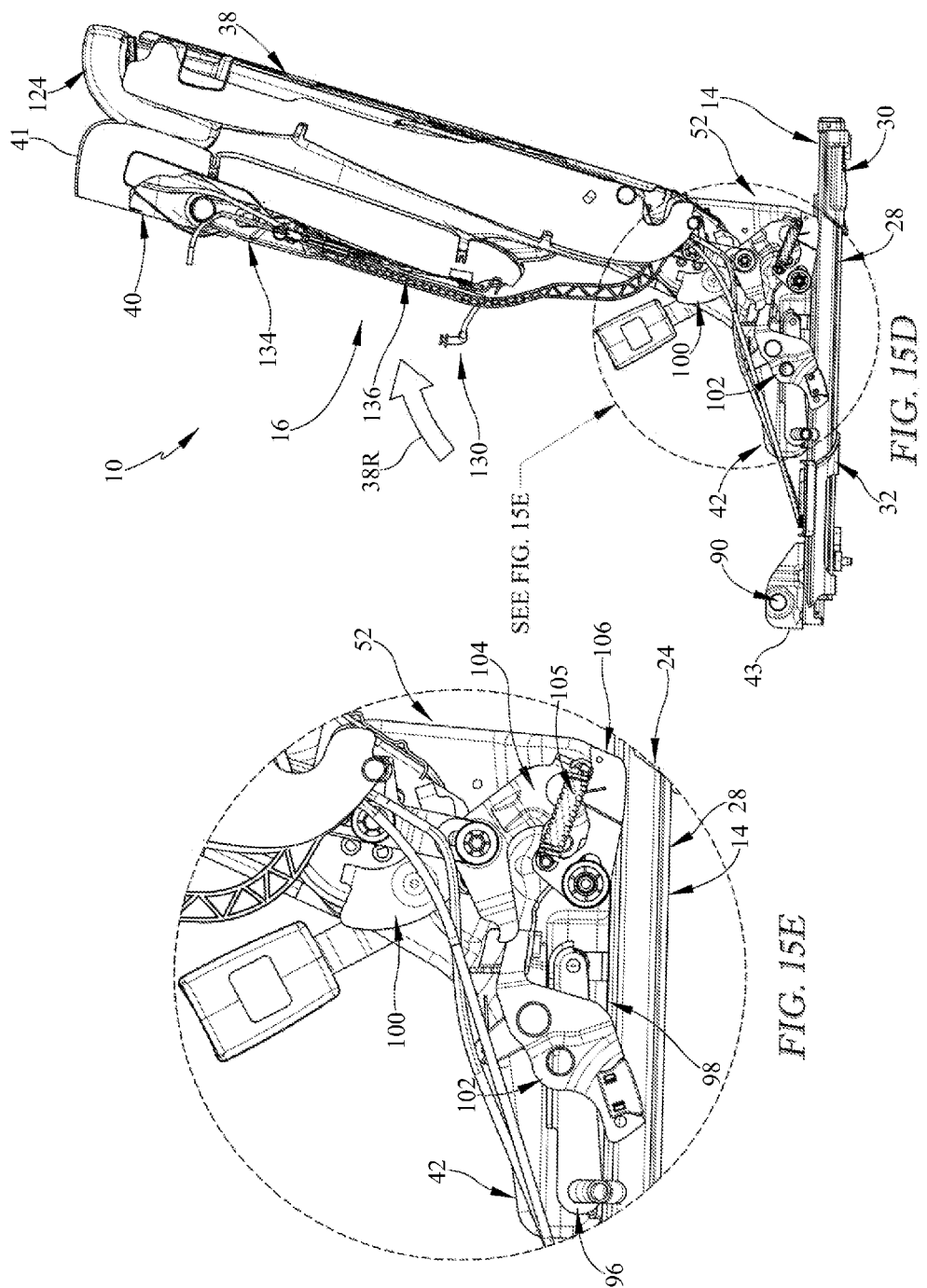

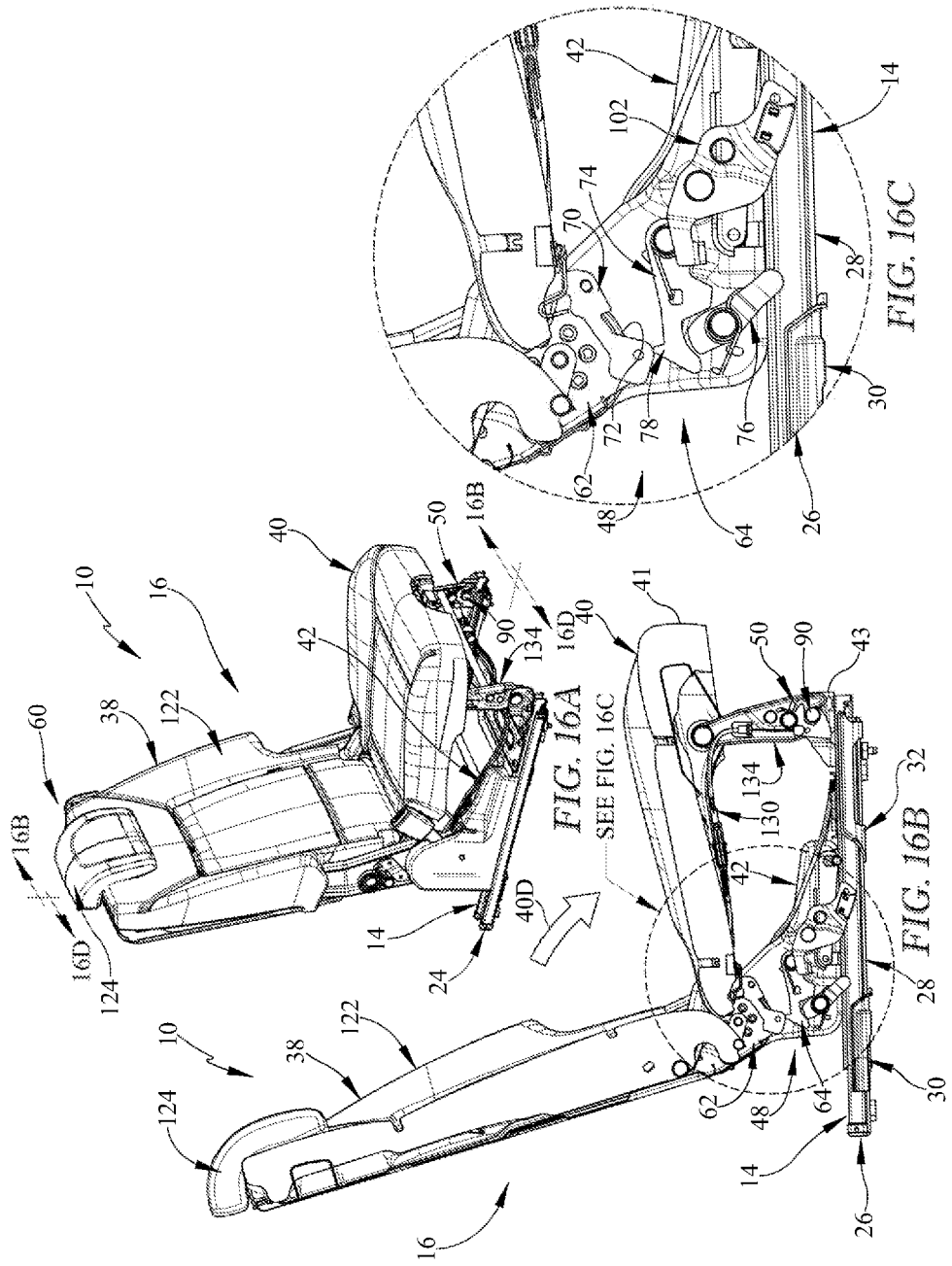

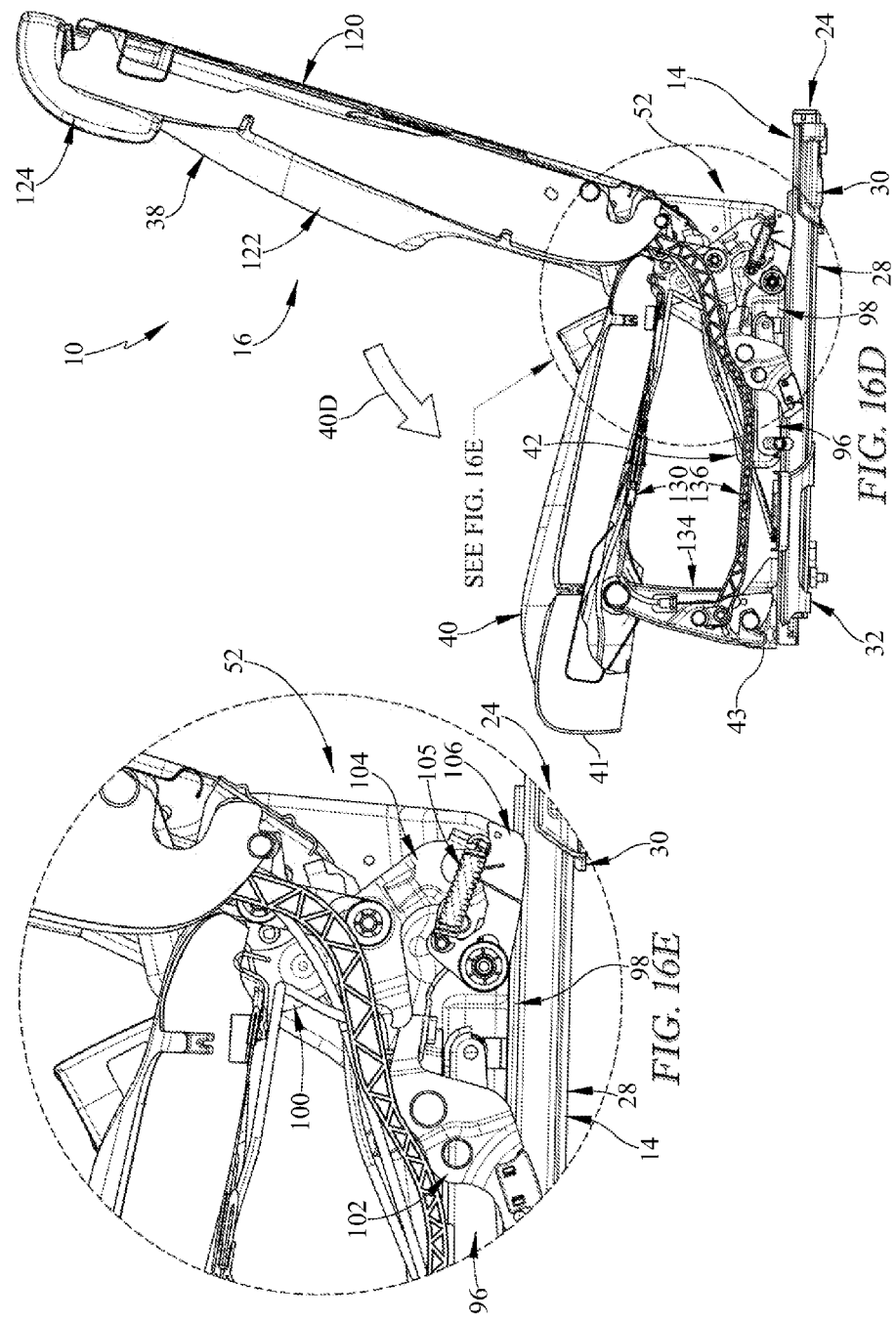

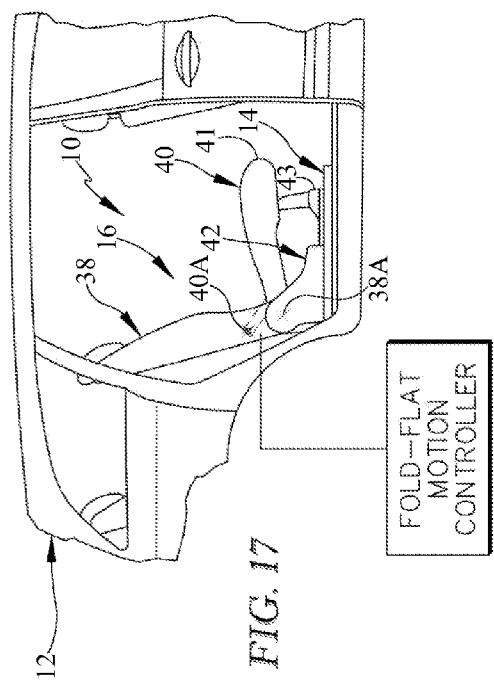
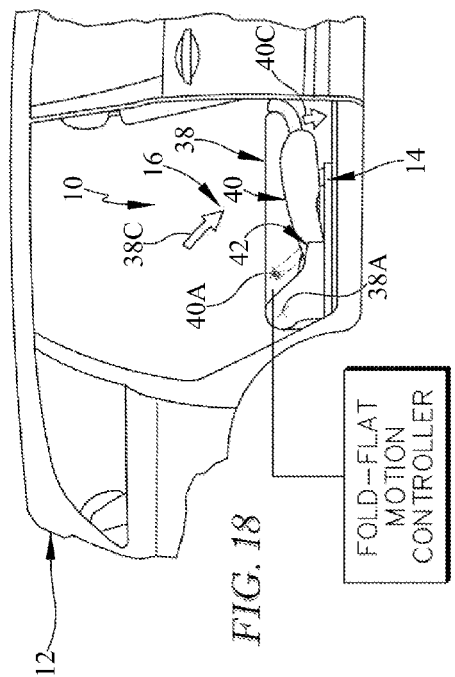
FIG. 17
FIG. 18

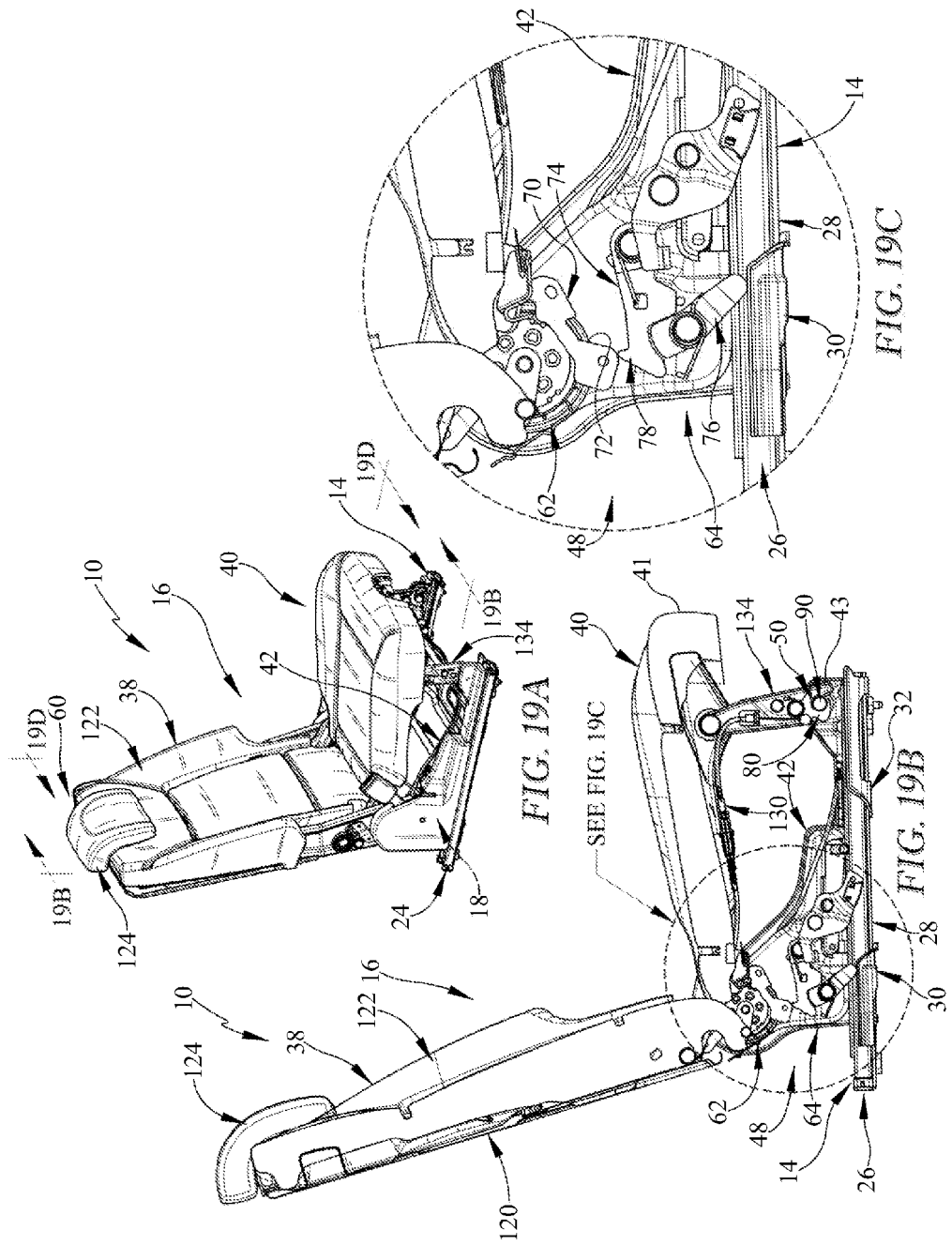

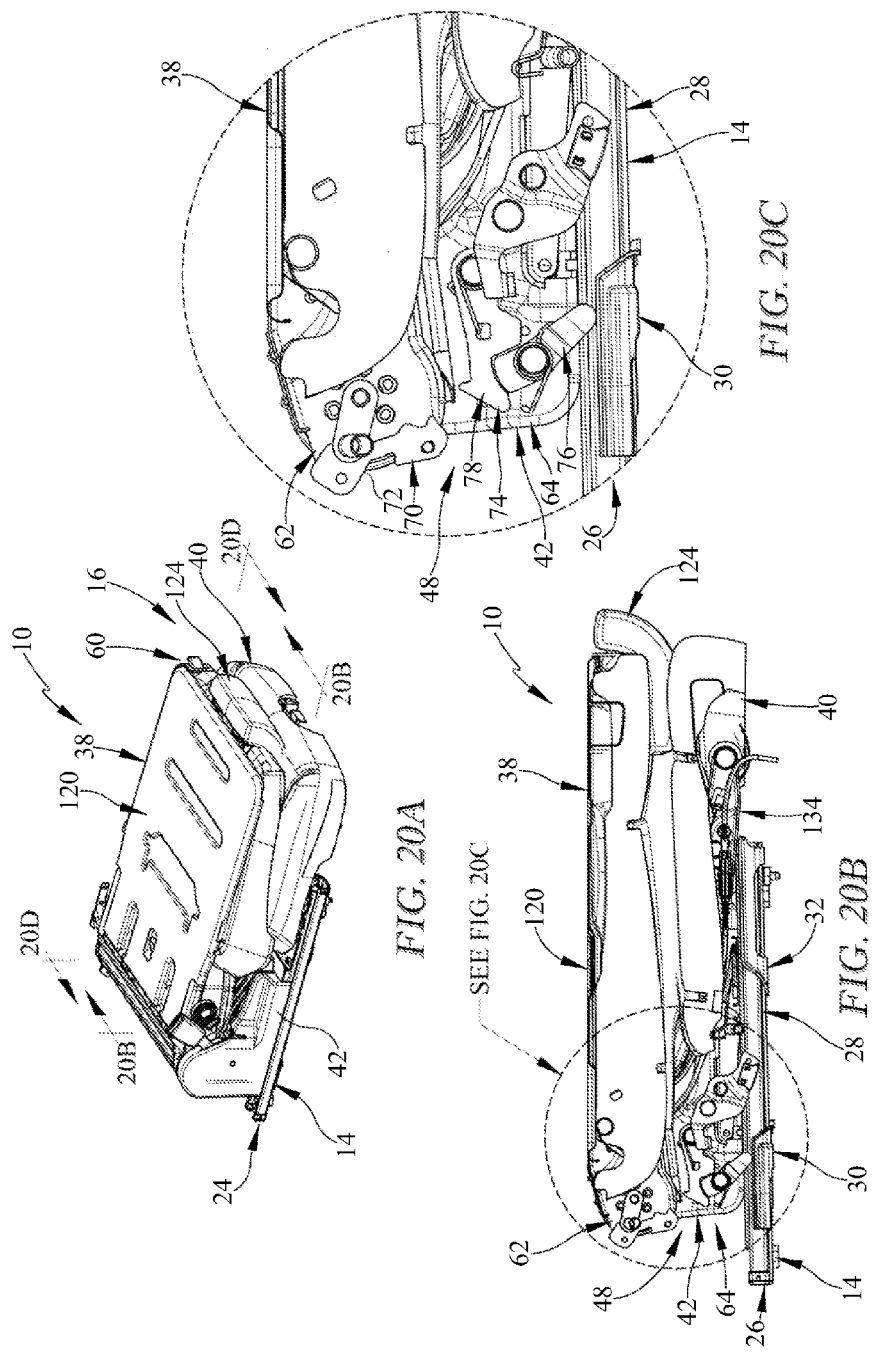

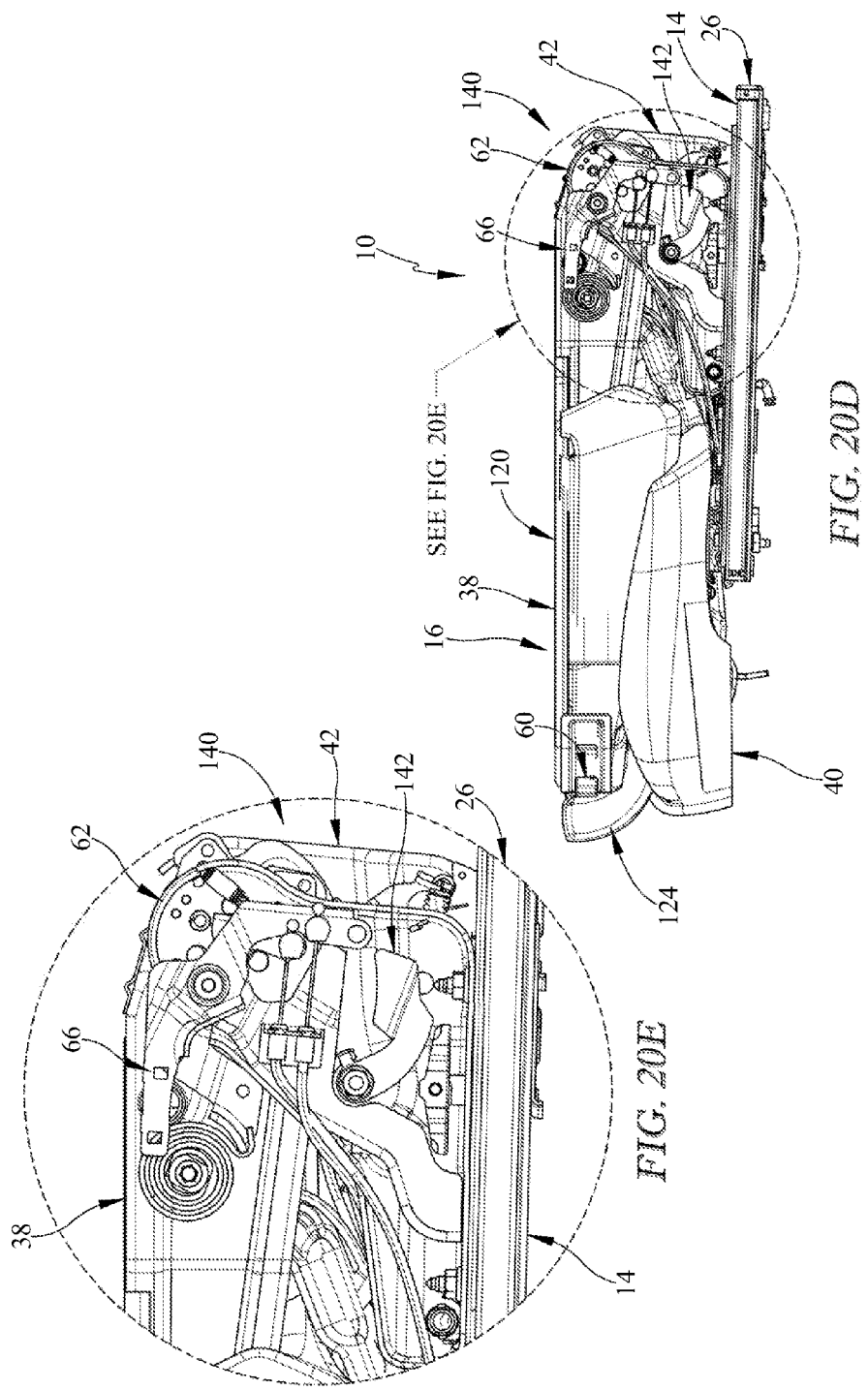

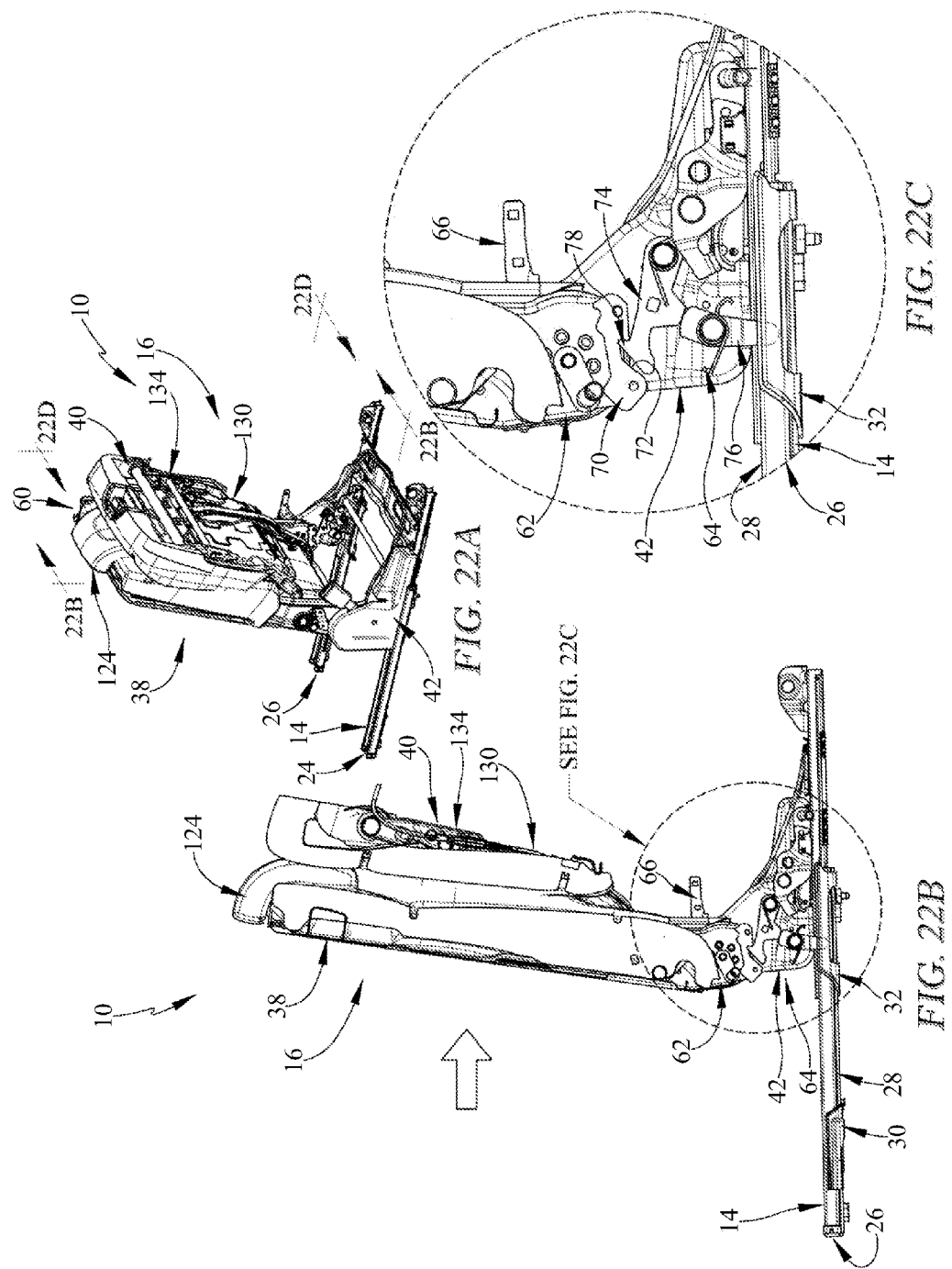

EASY-ENTRY VEHICLE SEAT

CROSS-REFERENCE TO RELATED APPLICATION

This application claims the benefit of U.S. Provisional Ser. No. 61/654,760 filed on Jun. 1, 2012, the entire contents of which are incorporated herein by reference.

TECHNICAL FIELD

The present disclosure relates to a seat assembly and, in particular, to a seat assembly with a changing configuration that enables enhanced access to surrounding areas of a vehicle cabin.

BACKGROUND

Vehicle seats are sometimes configured to move or otherwise change position to allow easier access to other areas of the vehicle cabin, such as to other vehicle seats or seating areas located behind the moveable seat. For example, a front vehicle seat may have a seat back that tilts forward to allow a passenger to enter or exit a rear vehicle seat or seating area behind the front seat. In another example, a vehicle seat may be configured to fold so that the seat back does not obstruct access to the desired area. However, in some types of vehicles, tilting seat backs or folding components are not enough on their own to provide adequate access to and/or from the area behind a vehicle seat.

SUMMARY

In accordance with one or more embodiments, a passenger support includes a foundation frame, a vehicle seat, and a seat-bottom motion controller. The foundation frame is configured to be coupled to a vehicle. The vehicle seat includes a seat base mounted to the foundation frame for movement between a rearward position and a forward position, a seat back extending from the seat base, and a seat bottom configured to move between an occupant-use position extending away from the seat back and a folded-up position along the seat back. The seat-bottom motion controller has a deactivated configuration that prevents the seat bottom from moving from the occupant-use position to the folded-up position, and an activated configuration that allows the seat bottom to move from the occupant-use position to the folded-up position.

In accordance with one or more other embodiments, a method of moving a passenger support from an occupant-use configuration to an easy-entry configuration includes the steps of: actuating a seat-bottom motion controller to change the seat-bottom motion controller from a deactivated configuration to an activated configuration; pivoting a seat back about a seat-back pivot axis relative to a seat base from an occupant-use position to a tilted-forward position; pivoting a seat bottom about a seat-bottom pivot axis relative to the seat back from an occupant-use position extending away from the seat back to a folded-up position extending along the seat back; and moving the seat base along a foundation frame from a rearward position to a forward position.

BRIEF DESCRIPTION OF THE DRAWINGS

Preferred exemplary embodiments will hereinafter be described in conjunction with the appended drawings, wherein like designations denote like elements, and wherein:

FIG. 1 is a side view of an embodiment of an easy-entry vehicle seat installed as a middle-row seat of a vehicle, where the vehicle seat includes a seat bottom and a seat back and is illustrated in a passenger-use configuration;

FIG. 2 is the side view of FIG. 1, showing the vehicle seat with the seat back in a tilted-forward position;

FIG. 3 is the side view of FIGS. 1 and 2, showing the vehicle seat with the seat bottom in a folded-up position;

FIG. 4 is the side view of FIGS. 1-3, showing the vehicle seat moved to an easy-entry configuration with the seat base in a moved-forward position;

FIG. 7A is a reduced-size view of FIG. 5, showing section lines for FIGS. 7B and 7D;

FIG. 7B is a cross-sectional view of the vehicle seat of FIG. 7A, showing an exemplary arrangement of easy-entry motion controller components on an outboard side of the seat with the seat in the passenger-use configuration;

FIG. 7C is an enlarged view of a portion of FIG. 7B;

FIG. 7D is a cross-sectional view of the vehicle seat of FIG. 7A, showing an exemplary arrangement of easy-entry motion controller components on an inboard side of the seat with the seat in the passenger-use configuration;

FIG. 7E is an enlarged view of a portion of FIG. 7D;

FIG. 7F is an enlarged view of another portion of FIG. 7D;

FIG. 8A is a perspective view of the vehicle seat of FIG. 7A, showing the seat back in the tilted-forward position;

FIG. 8B is a cross-sectional view of the vehicle seat of FIG. 8A, showing the easy-entry motion controller components on the outboard side of the seat with the seat back in the tilted-forward position;

FIG. 8C is an enlarged view of a portion of FIG. 8B;

FIG. 8D is a cross-sectional view of the vehicle seat of FIG. 8A, showing the easy-entry motion controller components on the inboard side of the seat with the seat back in the tilted-forward position;

FIG. 8E is an enlarged view of a portion of FIG. 8D;

FIG. 8F is an enlarged view of another portion of FIG. 8D;

FIG. 9A is a perspective view of the vehicle seat of FIG. 7A, showing the seat bottom in the folded-up position;

FIG. 9B is a cross-sectional view of the vehicle seat of FIG. 9A, showing the easy-entry motion controller components on the outboard side of the seat with the seat bottom in the folded-up position;

FIG. 9C is an enlarged view of a portion of FIG. 9B;

FIG. 9D is a cross-sectional view of the vehicle seat of FIG. 9A, showing the easy-entry motion controller components on the inboard side of the seat with the seat bottom in the folded-up position;

FIG. 9E is an enlarged view of a portion of FIG. 9D;

FIG. 10A is a perspective view of the vehicle seat of FIG. 7A, showing the seat base in the moved-forward position;

FIG. 10B is a cross-sectional view of the vehicle seat of FIG. 10A, showing the easy-entry motion controller components on the outboard side of the seat with the seat base in the moved-forward position;

FIG. 10C is an enlarged view of a portion of FIG. 10B;

FIG. 10D is a cross-sectional view of the vehicle seat of FIG. 10A, showing the easy-entry motion controller components on the inboard side of the seat with the seat base in the moved-forward position;

FIG. 10E is an enlarged view of a portion of FIG. 10D;

FIG. 11 is a side view of the easy-entry vehicle seat of FIGS. 1-4, showing the seat base, along with the seat back and the seat bottom, in a moved-back position;

FIG. 12 is the side view of FIG. 11, showing the vehicle seat with the seat back in an occupant-use position;

FIG. 13 is the side view of FIGS. 11 and 12, showing the seat bottom in a occupant-use position;

FIG. 14A is a perspective view of the vehicle seat of FIGS. 7A-10D, showing the seat base in a moved-back position;

FIG. 14B is a cross-sectional view of the vehicle seat of FIG. 14A, showing the easy-entry motion controller components on the outboard side of the seat with the seat base in the moved-back position;

FIG. 14C is an enlarged view of a portion of FIG. 14B;

FIG. 14D is a cross-sectional view of the vehicle seat of FIG. 14A, showing the easy-entry motion controller components on the inboard side of the seat with the seat base in the moved-back position;

FIG. 14E is an enlarged view of a portion of FIG. 14D;

FIG. 15A is a perspective view of the vehicle seat of FIG. 14A, showing the seat back in the occupant-use position;

FIG. 15B is a cross-sectional view of the vehicle seat of FIG. 15A, showing the easy-entry motion controller components on the outboard side of the seat with the seat back in the occupant-use position;

FIG. 15C is an enlarged view of a portion of FIG. 15B;

FIG. 15D is a cross-sectional view of the vehicle seat of FIG. 15A, showing the easy-entry motion controller components on the inboard side of the seat with the seat back in the occupant-use position;

FIG. 15E is an enlarged view of a portion of FIG. 15D;

FIG. 16A is a perspective view of the vehicle seat of FIG. 15A, showing the seat bottom in the occupant-use position;

FIG. 16B is a cross-sectional view of the vehicle seat of FIG. 16A, showing the easy-entry motion controller components on the outboard side of the seat with the seat bottom in the occupant-use position;

FIG. 16C is an enlarged view of a portion of FIG. 16B;

FIG. 16D is a cross-sectional view of the vehicle seat of FIG. 16A, showing the easy-entry motion controller components on the inboard side of the seat with the seat bottom in the occupant-use position;

FIG. 16E is an enlarged view of a portion of FIG. 16D;

FIG. 17 is a side view of the vehicle seat of FIGS. 1-4 and 11-13, showing the vehicle seat in the passenger-use configuration;

FIG. 18 is the side view of FIG. 18, showing the vehicle seat moved to a fold-flat configuration;

FIG. 19A is a perspective view of the vehicle seat of FIG. 16A, showing the vehicle seat in the passenger-use configuration;

FIG. 19B is a cross-sectional view of the vehicle seat of FIG. 19A, showing the easy-entry motion controller components on the outboard side of the seat with the seat in the passenger-use configuration;

FIG. 19C is an enlarged view of a portion of FIG. 19B;

FIG. 20A is a perspective view of the vehicle seat of FIG. 19A, showing the vehicle seat in the fold-flat configuration;

FIG. 20B is a cross-sectional view of the vehicle seat of FIG. 20A, showing the easy-entry motion controller components on the outboard side of the seat with the seat in the fold-flat configuration;

FIG. 20C is an enlarged view of a portion of FIG. 20B;

FIG. 20D is a side view of the outboard side of the vehicle seat of FIG. 20A;

FIG. 20E is an enlarged view of a portion of FIG. 20D;

FIG. 22A is a perspective view of the vehicle seat of FIG. 19A, showing the vehicle seat in the easy-entry configuration;

FIG. 22B is a cross-sectional view of the vehicle seat of FIG. 22A showing the easy-entry motion controller components on the outboard side of the seat with the seat in easy-entry configuration;

FIG. 22C is an enlarged view of a portion of FIG. 22B;

DETAILED DESCRIPTION

Figure 5:
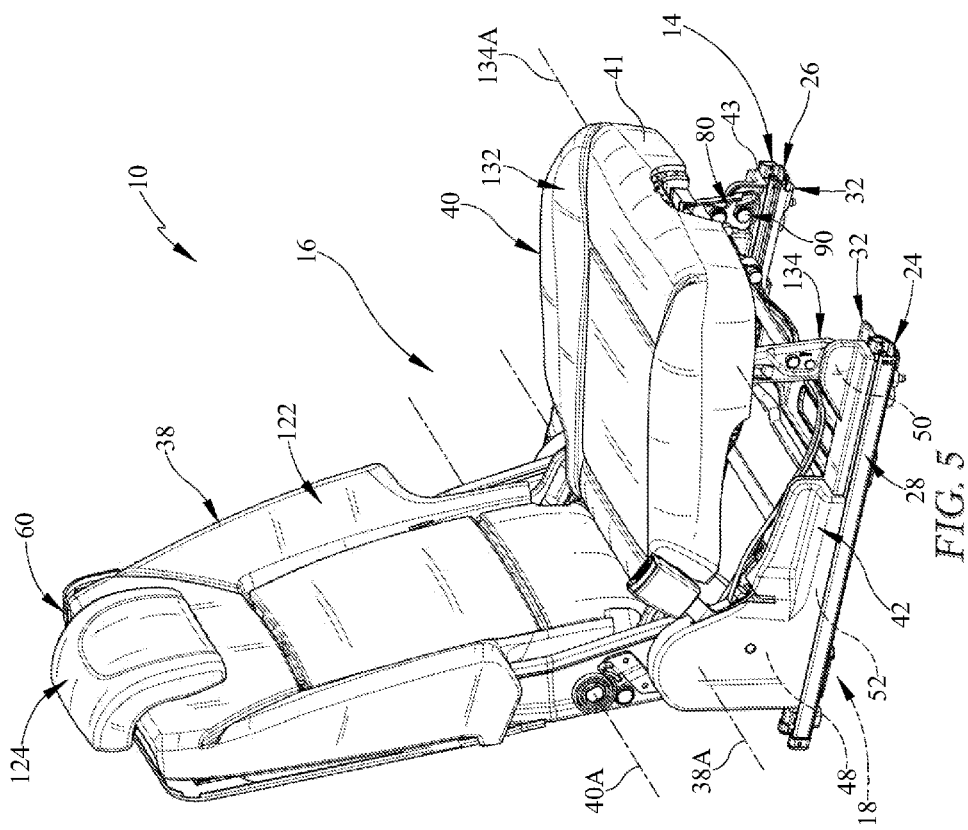
FIG. 5 is a perspective view of an embodiment of the easy-entry vehicle seat.

An illustrative middle-row passenger support 10 for use in a vehicle 12 in accordance with the present disclosure includes a foundation frame 14 coupled to a floor 15 of the vehicle 12, a vehicle seat 16 mounted on the foundation frame 14, and an easy-entry motion controller 18 as shown, for example, in FIG. 1. Foundation frame 14 is configured to support vehicle seat 16 above vehicle floor 15 between a front-row passenger support 20 and a back-row passenger support 22 in this example. Vehicle seat 16 moves relative to foundation frame 14 from an occupant-use or passenger-use configuration to an easy-entry configuration. FIG. 1 shows the vehicle seat 16 in an illustrative passenger-use configuration for supporting a passenger during movement of vehicle 12. FIG. 4 shows the vehicle seat 16 in an illustrative easy-entry configuration for easing entry to and exit from the back-row passenger support 22. The easy-entry motion controller 18 is configured to provide guide means for controlling the motion of the vehicle seat 16 as vehicle seat 16 moves between the passenger-use configuration and the easy-entry configuration.

Figure 6:
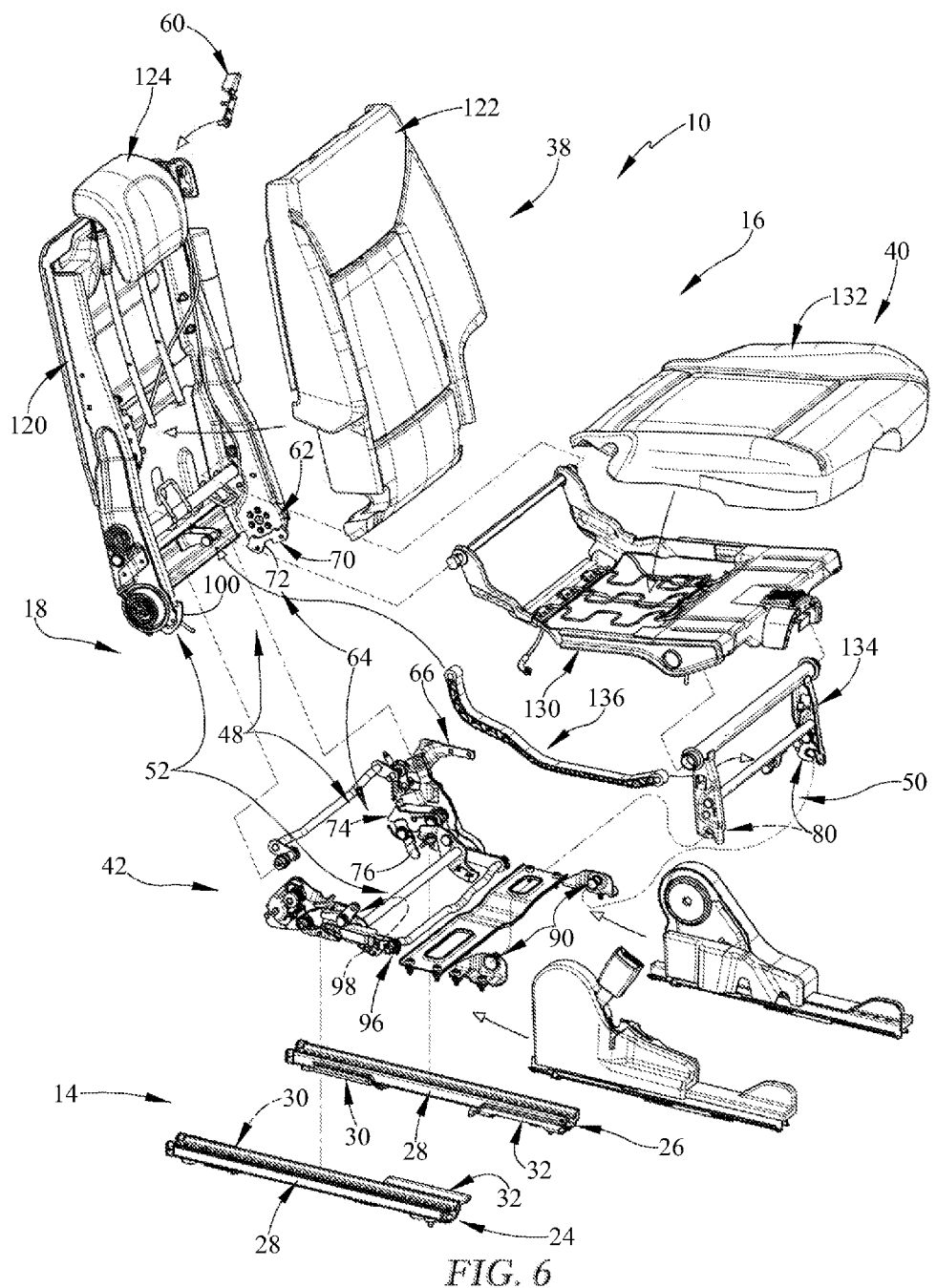
FIG. 6 is an exploded view of the vehicle seat of FIG. 5.

Foundation frame 14 includes a first rail 24 and a second rail 26, as shown in FIG. 6. Each rail 24, 26 includes a track 28, a rear ramp 30 coupled to track 28, and a forward ramp 32 coupled to track 28. Track 28 is configured to support vehicle seat 16 for movement along track 28. Rear ramp 30 extends along an inboard side of track 28 near a back side 34 of track 28 and may block or prevent rearward motion of vehicle seat 16 along track 28. Forward ramp 32 extends along an inboard side of track 28 near a front side 36 of track 28 and may block or prevent forward motion of vehicle seat 16 along track 28.

Vehicle seat 16 includes a seat back 38, a seat bottom 40, and a seat base 42 that are each movable so that vehicle seat 16 can be reconfigured from the passenger-use configuration to the easy-entry configuration as shown in FIGS. 1-4. Seat back 38 is coupled to seat base 42 for pivotable movement about a seat-back pivot axis 38A. Seat bottom 40 is coupled to seat back 38 for pivotable movement about a seat-bottom pivot axis 40A. Seat base 42 is coupled to tracks 28 of foundation frame 14 for movement along foundation frame 14. In this example, the seat base 42 is coupled to the tracks for sliding movement along the foundation frame.

When vehicle seat 16 moves from the passenger-use configuration, shown in FIG. 1, to the easy-entry configuration, shown in FIG. 4, seat back 38 is pivoted forward from an occupant-use position, which is generally upright in this example, to a tilted-forward position. By moving seat back 38 from the occupant-use position to the tilted-forward position, seat back 38 moves from forming an angle with foundation frame 14 underlying seat base 42 greater than or equal to about 90 degrees to forming an acute angle with foundation frame 14. Seat bottom 40 is pivoted upwardly from an occupant-use position, in which it is extending generally horizontally away from seat back 38, to a folded-up position, in which it is extending generally along seat back 38. By pivoting seat bottom 40 from the occupant-use position to the folded-up position, a front edge 41 of seat bottom 40 is moved from a first position in front of a front edge 43 of seat base 42 to a second position behind front edge 43 of seat base 42 thereby allowing vehicle seat 16 to move or slide further forward than if seat base 42 remained in the occupant-use position. Seat base 42 slides or otherwise moves forward from one of a series of design or rearward positions to a forward position.

Easy-entry motion controller 18 is configured to control the motion of vehicle seat 16 as vehicle seat 16 moves from the passenger-use configuration to the easy-entry configuration as suggested in FIGS. 1-4. Easy-entry motion controller 18 includes a seat-back motion controller 48, a seat-bottom motion controller 50, and a seat-base motion controller 52 as shown diagrammatically in FIGS. 1-4. Easy-entry motion controller 18 may also include an actuator 60, shown as a manual release lever in FIG. 6. Automated actuators are also possible. Each motion controller 48, 50, 52 may be activated to allow movement of the corresponding vehicle seat 16 component 38, 40, 42 as vehicle seat 16 is moved from the passenger-use configuration, shown in FIG. 1, to the easy-entry configuration, shown in FIG. 4. Seat-back motion controller 48 and seat-bottom motion controller 50 are both activated to allow motion of seat back 38 and seat bottom 40 in response to actuation of the actuator 60, which in this case includes a user lifting upwardly on the release lever 60 as shown in FIG. 8A. Seat-base motion controller 52 is activated to allow motion of seat base 42 in response to seat back 38 being moved from the occupant-use position to the tilted-forward position.

The vehicle seat 16 can move from the passenger-use configuration, shown in FIG. 1, to the easy-entry configuration, shown in FIG. 4, by a user or some other component operating easy-entry motion controller 18. To operate the illustrated easy-entry motion controller 18, the user first lifts upwardly on release lever 60 to activate the seat-back motion controller 48 and seat-bottom motion controller 50. Then the user pivots seat back 38 about seat-back pivot axis 38A from the occupant-use position to the tilted-forward position as suggested by arrow 38F in FIG. 2. Pivoting seat back 38 to the tilted-forward position activates seat-base motion controller 52. Next the user pivots seat bottom 40 about seat-bottom pivot axis 40A from the occupant-use position to the folded-up position as suggested by arrow 40U in FIG. 3. In some methods of use, the user may pivot seat bottom 40 before pivoting seat back 38 or both may be pivoted at the same time. The user can then release lever 60. Finally, the user can move or slide seat base 42 along foundation frame 14 from one of the rearward positions to the forward position as suggested by arrow 42F in FIG. 4.

When vehicle seat 16 is moved to the easy-entry configuration, the seat-back motion controller 48 is deactivated so that the seat back is held in the tilted-forward position as shown in FIGS. 10B and 10C. Seat-bottom motion controller 50 and seat-base motion controller 52 remain activated so that seat bottom 40 and seat base 42 are still movable as shown in FIGS. 10D and 10E. However, in the illustrated embodiment, seat bottom 40 is biased toward the folded-up position and seat base 42 is biased toward the forward position so that vehicle seat 16 is held in the easy-entry configuration until a user acts to return vehicle seat 16 to the passenger-use configuration.

The user can return vehicle seat 16 from the easy-entry configuration to the passenger-use configuration by again operating easy-entry motion controller 18 as suggested in FIGS. 11-13. To return to the passenger-use configuration, the user first slides or otherwise moves seat base 42 rearwardly along foundation frame 14 from the forward position to a full-return position, which is one of the series of design or rearward positions, as suggested by arrow 42R in FIG. 11. Once seat base 42 reaches the full-return position, seat-back motion controller 48 is activated allowing seat back 38 to pivot. The user can then pivot seat back 38 rearwardly from the tilted-forward position to the occupant-use position as suggested by arrow 38R in FIG. 12. When seat back 38 is in the occupant-use position, seat-base motion controller 52 is deactivated, thus preventing or blocking seat base 42 (along with seat back 38 and seat bottom 40) from sliding or moving along foundation frame 14. Finally, the user can pivot seat bottom 40 downwardly from the folded-up position to the occupant-use position as suggested by arrow 40D in FIG. 13. When seat bottom 40 reaches the occupant-use position, seat-bottom motion controller 50 is deactivated and the passenger-use configuration of vehicle seat 16 is reestablished.

Seat-back motion controller 48 is configured to move between a deactivated configuration and an activated configuration. In the deactivated configuration, the seat back 38 is blocked or prevented from moving from the occupant-use position, as shown in FIGS. 7B and 7C. In the activated configuration, the seat back 38 is allowed to move from the occupant-use position to the tilted-forward position as shown in FIGS. 8B and 8C. Seat-back motion controller 48 includes a recliner mechanism 62 and a return linkage 64. Recliner mechanism 62 and return linkage 64 are coupled to seat back 38 and are configured to selectively prevent or allow movement of seat back 38 relative to seat base 42. Return linkage 64 is coupled to seat back 38 and to seat base 42. Return linkage 64 is configured to selectively prevent or allow movement of seat back 38 from the tilted-forward position to the occupant-use position. Actuator 60 is coupled to recliner mechanism 62 to release recliner mechanism 62 so that seat back 38 is free to pivot from the occupant-use position to the tilted-forward position.

Recliner mechanism 62 is similar to the rotary recliner mechanism described in U.S. Pat. No. 7,360,838, which is incorporated herein by reference in its entirety. Recliner mechanism 62 is configured to prevent seat back 38 from pivoting to the tilted-forward position until actuator 60 is lifted up by a user. A handle 66 is coupled to recliner mechanism 62 and is configured to release recliner mechanism 62 so that seat back 38 may pivot rearwardly to a reclined position as suggested in FIGS. 8A-8C. Handle 66 may also release recliner mechanism 62 so that seat back 38 pivots forwardly until seat back 38 contacts seat bottom 40 such that vehicle seat 16 assumes a fold-flat configuration as shown in FIGS. 18 and 20A-D. In other embodiments, recliner mechanism 62 may be of any other suitable type known in the art.

Figure 6A:
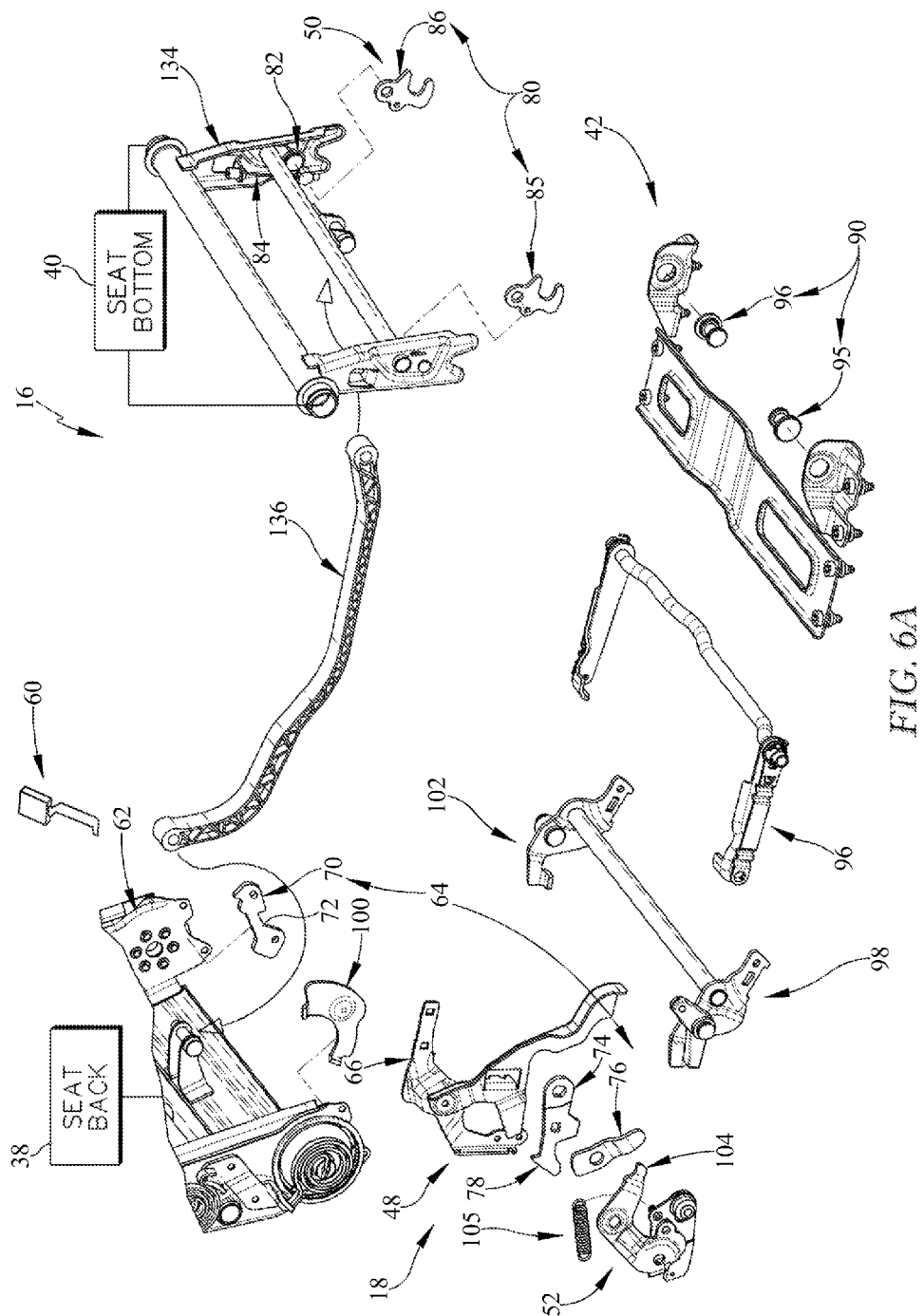
FIG. 6A is another exploded view of a portion of the vehicle seat of FIG. 5.

Return linkage 64 is configured to block or prevent seat back 38 from moving away from the tilted-forward position to the occupant-use position after vehicle seat 16 has moved to the easy-entry configuration as shown in FIGS. 10B-10C. Return linkage 64 then releases seat back 38 to move from the tilted-forward position to the occupant-use position in response to seat base 42 sliding or otherwise moving from the forward position to the full-return position along foundation frame 14 as shown in FIGS. 14A-14C. The illustrated return linkage 64 includes a bracket 70 coupled to seat back 38, a pivot member 74 (sometimes referred to as a hook), and a rearward return blocker 76 as shown in FIG. 6A. Bracket 70 is formed to include a notch 72. Pivot member 74 is coupled to seat base 42 for pivotable movement and is formed to include a protrusion 78 sized to be received in notch 72 of bracket 70.

Rearward return blocker 76 is coupled for pivotable movement to seat base 42 and is configured to move between a pivoted-up position, shown in FIG. 7C, and a pivoted-down position shown in FIG. 10C. In the pivoted-up position, rearward return blocker 76 allows protrusion 78 of pivot member 74 to be moved out of notch 72. In the pivoted-down position, rearward return blocker 76 blocks protrusion 78 of pivot member 74 to be moved out of notch 72. Rearward return blocker 76 is biased to the pivoted-down position.

When vehicle seat 16 is in the easy-entry configuration, protrusion 78 is received in notch 72 and is blocked from moving out of notch 72 by rearward return blocker 76, thus, seat back 38 is blocked from pivoting away from the tilted-forward position, as shown in FIG. 10C. As vehicle seat 16 moves from the easy-entry configuration to the passenger-use configuration, seat base 42 moves or slides back along foundation frame 14 until seat base 42 reaches the full-return position as shown in FIG. 11. At the full-return position, rearward return blocker 76 contacts rear ramp 30 of foundation frame 14, moving rearward return blocker 76 away from the pivoted-down position as shown in FIG. 14C. In response to rearward return blocker 76 contacting rear ramp 30 of foundation frame 14, seat back 38 is allowed to pivot from the tilted-forward position to the occupant-use position as shown in FIGS. 12 and 15B-C. Thus, return linkage 64 releases seat back 38 to move from the tilted-forward position to the occupant-use position in response to seat base 42 moving from the forward position to the full-return position along foundation frame 14.

Seat-bottom motion controller 50 is configured to move or change between a deactivated configuration and an activated configuration. In the deactivated configuration, seat bottom 40 is prevented or blocked from moving from the occupant-use position, as shown in FIGS. 7B, 7D, and 7F. In the activated configuration, seat bottom 40 is allowed to move from the occupant-use position as shown in FIGS. 8B, 8D, and 8F. Seat-bottom motion controller 50 moves or changes from the deactivated configuration to the activated configuration in response to the user lifting up on actuator 60 as suggested by arrow 60A in FIG. 8A. Thus, when seat bottom 40 is in the occupant-use position, both seat-back motion controller 48 and seat-bottom motion controller 50 are activated simultaneously to allow movement of seat back 38 and seat bottom 40 in response to the user lifting up on release lever 60, or in response to other actuation, as suggested in FIGS. 8A-F.

The illustrated seat-bottom motion controller 50 includes a latch 80, a bias spring 82 and a cable 84 as shown, for example, in FIG. 6A. Latch 80 is coupled to seat bottom 40 for pivotable movement about a latch pivot axis 80A between an engaged position, wherein latch 80 receives a catch 90 coupled to seat base 42 blocking seat bottom 40 from pivoting, and a disengaged position, wherein latch 80 disengages from catch 90 allowing seat bottom 40 to pivot. Bias spring 82 contacts seat bottom 40 and latch 80 to bias latch 80 toward the engaged position. Cable 84 is illustratively a Bowden cable and extends from latch 80 to release lever 60 so that latch 80 moves to the disengaged position in response to the user lifting up on release lever 60. Thus, seat bottom 40 is blocked from pivoting from the occupant-use position to the folded-up position unless a user lifts up on release lever 60 to overcome the force of bias spring 82 and pivot latch 80 from the engaged position to the disengaged position. Such an arrangement may prevent inadvertent or undesirable pivoting of seat bottom 40 away from the occupant-use position.

Latch 80 is illustratively made up of two U-shaped hooks 85, 86, as shown in FIG. 6A, but in other embodiments may be configured in any suitable geometry. Catch 90 is illustratively made up of two posts 95, 96 extending inwardly toward the center of vehicle seat 16 but in other embodiments may be configured in any suitable geometry such as a ring, a lip, or the like.

Seat-base motion controller 52 is movable or otherwise changeable between a deactivated configuration, shown in FIGS. 7D and 7E, and an activated configuration as shown in FIGS. 9D and 9E. In the deactivated configuration, seat base 42 (along with seat back 38 and seat bottom 40) is blocked from moving along foundation frame 14 to the forward position. In the activated configuration, seat base 42 is allowed to move along foundation frame 14 to the forward position. Seat-base motion controller 52 is changed from the deactivated configuration to the activated configuration in response to seat back 38 moving from the occupant-use position to the tilted-forward position. Conversely, seat-base motion controller 52 is moved from the activated configuration to the deactivated configuration in response to seat back 38 moving from the tilted-forward position to the occupant-use position.

Seat-base motion controller 52 illustratively includes a track lock 97 and an entry linkage 98 as shown in FIG. 6. Track lock 97 moves between an engaged position, blocking movement of seat base 42 along the range of design (i.e. rearward) positions relative to foundation frame 14, and a disengaged position, allowing movement of seat base 42 along the range of design positions relative to foundation frame 14. Entry linkage 98 selectively blocks or allows seat bottom 42 to move forwardly past the range of design positions to the forward position along foundation frame 14. Entry linkage 98 also moves track lock 97 to the disengaged position in response to seat back 38 moving to the tilted-forward position.

Entry linkage 98 illustratively includes a cam plate 100, a forward slide blocker 102, and a cam follower 104 (sometimes called a roller) as shown in FIG. 6A. Cam plate 100 is coupled to seat back 38 to pivot therewith about seat-back pivot axis 38A. Forward slide blocker 102 and cam follower 104 are coupled to seat base 42 for pivotable movement relative thereto.

Forward slide blocker 102 is pivotable between a lowered position, as shown in FIG. 7E, and a raised position as shown in FIG. 8E. In the lowered position, forward slide blocker 102 blocks seat base 42 from moving to the forward position since forward slide blocker 102 would contact forward ramp 32 before the forward position is reached as shown in FIGS. 7D and 7E. In the raised position, forward slide blocker 102 allows seat base 42 to move to the forward position as shown in FIGS. 10D and 10E. Also, while in the raised position, slide blocker 102 pushes track lock 97 from the normally engaged position to the disengaged position as shown in FIG. 8E.

Cam follower 104 is biased into contact with cam plate 100 and is configured to move along cam plate 100 as seat back 38 moves from the occupant-use position to the tilted-forward position as suggested in FIGS. 7E and 8E. When seat back 38 moves from the occupant-use position to the tilted-forward position, cam follower 104 pushes forward slide blocker 102 from the lowered position to the raised position as shown in FIGS. 8D and 8E.

Seat-bottom motion controller 50 may also include a memory lever 106 arranged over rear ramp 30 of foundation frame 14 and coupled to cam follower 104 by a spring 105 as shown in FIG. 7E. Memory lever 106 is configured to move between a raised position and a lowered position. In the raised position, memory lever 106 allows movement of seat base 42 rearward past the full-return position. In the lowered position, memory lever 106 blocks sliding of seat base 42 rearward past the full-return position. Memory lever 106 is biased to the raised position by the spring 105 when seat back 38 is in the occupant-use position as shown in FIG. 7E. However, memory lever 106 is biased to the lowered position when seat back 38 is in the tilted-forward position as shown in FIG. 8E. When seat base 42 moves past the full-return position with the seat back 38 in the tilted-forward position, memory lever 106 blocks seat base 42 from returning rearward past the full-return position until seat back 38 is returned to the occupant-use position as shown in FIGS. 14E and 15E.

Seat back 38 illustratively includes a shell 120, a cushion 122, and a headrest 124 as shown in FIG. 6. Shell 120 is coupled to seat base 42 for movement relative thereto about seat-back pivot axis 38A. Cushion 122 is coupled to the front of shell 120 to support the body of a user. Headrest 124 is coupled to the top of shell 120 to support the head of a user.

Seat bottom 40 illustratively includes a seat pan 130, a cushion 132, and a support leg 134 as shown, for example, in FIG. 6. Seat pan 130 is coupled to seat back 38 for movement about seat-bottom pivot axis 40A. Cushion 132 is coupled to seat pan 130 to support the bottom side of a user. Support leg 134 is coupled to seat pan 130 for pivotable movement about a leg pivot axis 134A. Support leg 134 moves between a support position, extending down substantially perpendicular to seat pan 130 as shown in FIG. 1-2, and a stored position, extending substantially along seat pan 130 as shown in FIG. 3-4.

Seat-bottom motion controller 50 may also include a guide link 136 that is configured to move support leg 134 from the support position to the stored position in response to the seat bottom 40 moving from the occupant-use position to the folded-up position, as shown in FIGS. 7D and 10D. Guide link 136 is pivotably coupled to shell 120 of seat back 38 and to support leg 134. In the illustrated embodiment, guide link 136 is biased toward seat back 38 by a spring (not shown) so that seat bottom 40 is biased toward the folded-up position.

Figure 21:
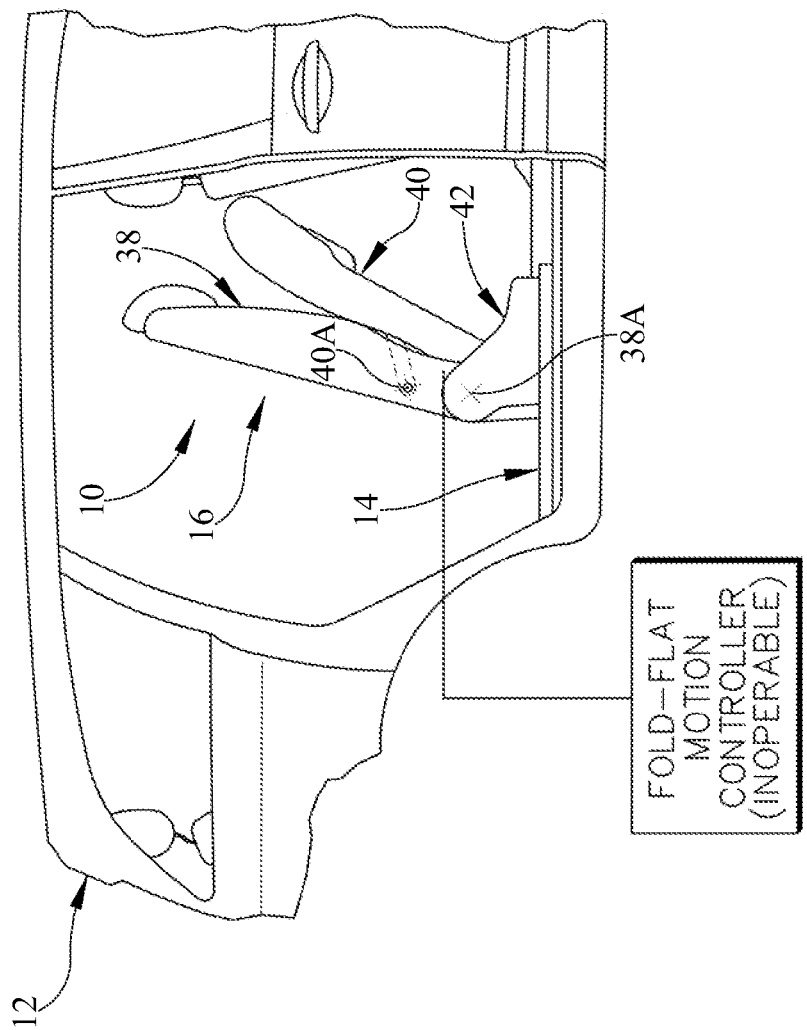
FIG. 21 is a side view of the vehicle seat of FIGS. 1-4 and 11-13, showing the vehicle seat in the easy-entry configuration with the fold-flat motion controller inoperable.

Vehicle seat 16 may also be configured to move from the passenger-use configuration, as shown in FIG. 17, to a folded-flat position as shown in FIG. 18. During movement to the folded-flat configuration, seat back 38 and seat bottom 40 collapse forward as suggested by arrows 38C and 40C in FIG. 18. Vehicle seat 16 includes a fold-flat motion controller 140 configured to block or allow movement of vehicle seat 16 to the fold-flat configuration. Fold-flat motion controller 140 is configured to allow vehicle seat 16 to move from the passenger-use configuration to the fold-flat configuration, as suggested in FIGS. 17 and 18, but blocks vehicle seat 16 from moving from the easy-entry configuration to the fold-flat configuration as suggested in FIG. 21.

In the fold-flat configuration, seat back 38 pivots about seat-back pivot axis 38A so that seat back 38 is substantially parallel to foundation frame 14 as shown in FIG. 20D. Seat bottom 40 is moved down closer to foundation frame 14 by pivoting support leg 134 so that support leg 134 extends substantially parallel to foundation frame 14 as shown in FIG. 20B. Thus, both seat back 38 and seat bottom 40 extend substantially parallel to foundation frame 14 when vehicle seat 16 is in the fold-flat configuration.

Fold-flat motion controller 140 illustratively includes recliner mechanism 62, handle 66, and interlock plate 142 as shown in FIG. 20E. Recliner mechanism 62, as described above, is configured to allow seat back 38 to pivot about a pivot axis from the occupant-use position to a fold-flat configuration, substantially parallel to foundation frame 14. Handle 66 is lifted up by a user to activate recliner mechanism 62 to allow seat back 38 to move the fold-flat configuration. Interlock plate 142 is configured to block handle 66 from being activated by a user when vehicle seat 16 is in the easy-entry configuration.

Figures 19D, 19E:
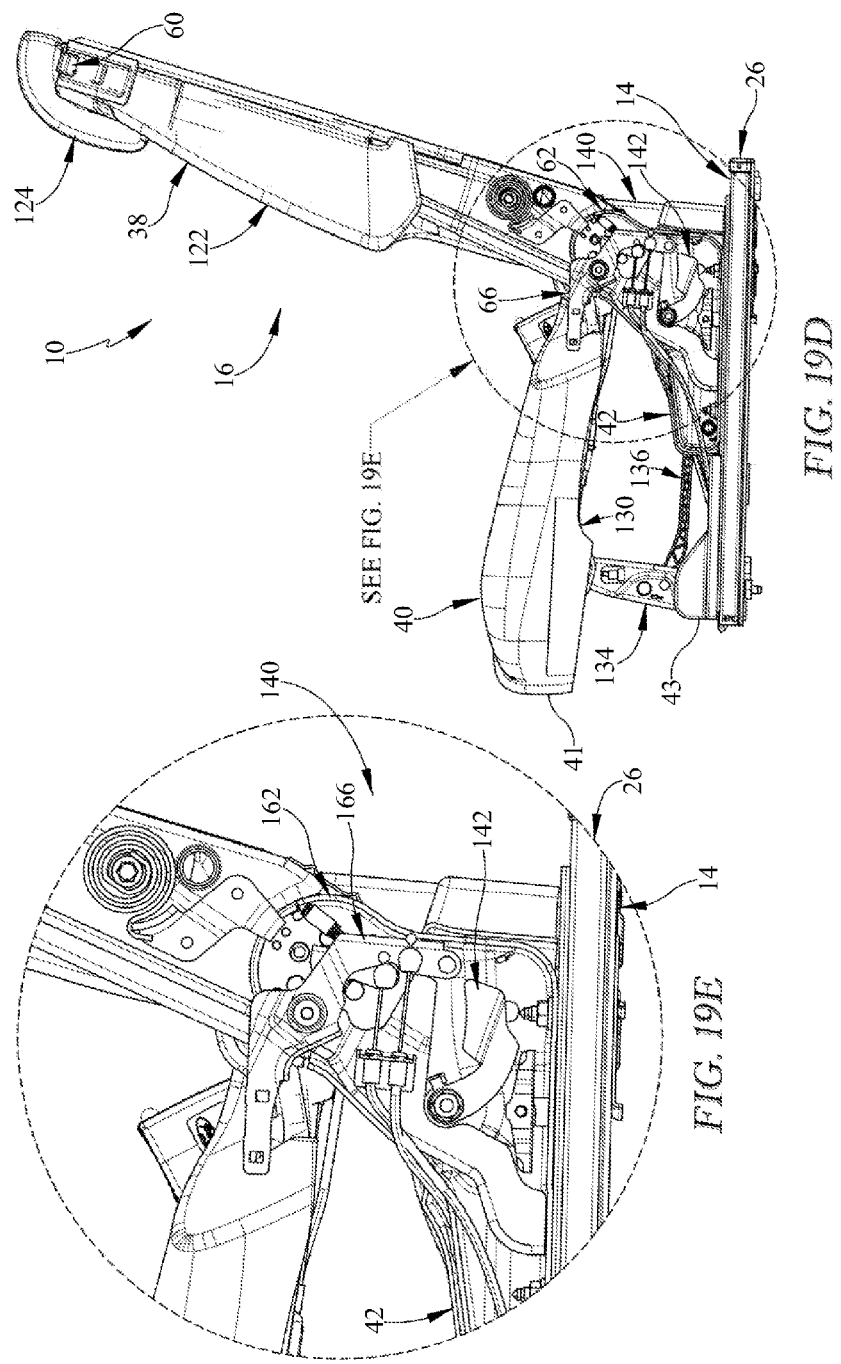
FIG. 19D is a cross-sectional view of the vehicle seat of FIG. 19A, showing the easy-entry motion controller components on the inboard side of the seat with the seat in the passenger-use configuration.
FIG. 19E is an enlarged view of a portion of FIG. 19D.

Interlock plate 142 moves between a lowered position, shown in FIG. 19E, and a raised position shown in FIG. 20E. In the lowered position, interlock plate 142 allows handle 66 to pivot relative to seat base 42 so that seat back 38 can move to the fold-flat configuration. In the raised position, interlock plate 142 blocks handle 66 from pivoting relative to seat base 42 so that seat back 38 can move to the fold-flat configuration.

Figures 22D, 22E:
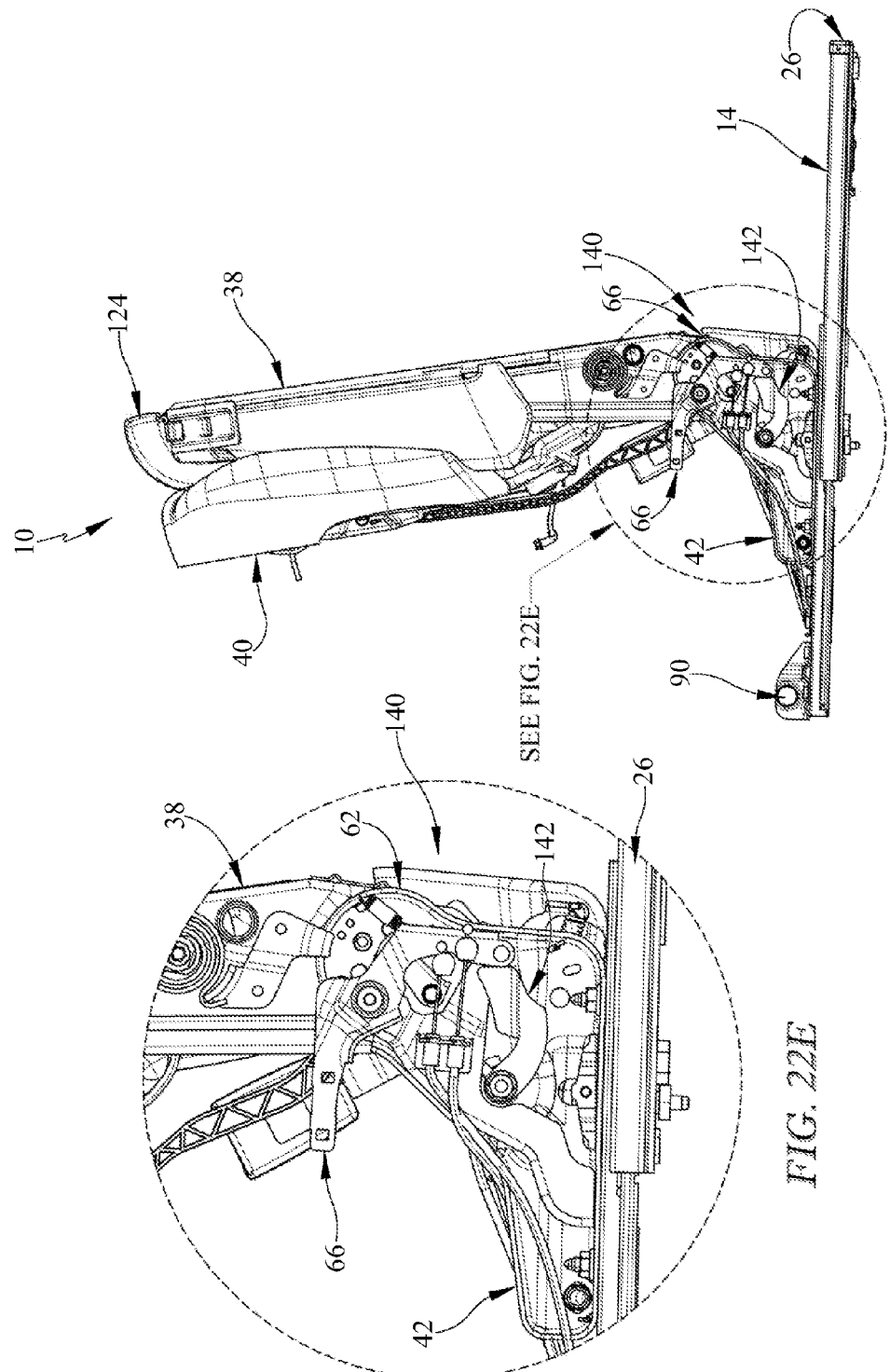
FIG. 22D is a side elevation view of the outboard side of the vehicle seat of FIG. 22A.
FIG. 22E is an enlarged view of a portion of FIG. 22D.

Interlock plate 142 may be coupled to and pivot with pivot member 74 of return linkage 64 as suggested in FIGS. 22C and 22E. When pivot member 74 is pivoted up so that protrusion 78 is received in notch 72, interlock plate 142 is pivoted to the raised position and blocks seat back 38 from moving to the fold-flat configuration. Therefore, any time that vehicle seat 16 is in the easy-entry configuration, fold-flat motion controller 140 is inoperable as shown in FIGS. 21 and 22A-D.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A passenger support, comprising:
  a foundation frame configured to be coupled to a vehicle;
  a vehicle seat, including: a seat base having a front edge, the seat base being mounted to the foundation frame for movement between a rearward position and a forward position, a seat back extending from the seat base, and a seat bottom having a front edge, the seat bottom being configured to move between an occupant-use position extending away from the seat back and a folded-up position along the seat back, wherein the front edge of the seat bottom is behind the front edge of the seat base in the folded-up position; and
  a seat-bottom motion controller having a deactivated configuration that prevents the seat bottom from moving from the occupant-use position to the folded-up position, and an activated configuration that allows the seat bottom to move from the occupant use position to the folded-up position.

2. A passenger support as defined in claim 1, further comprising an actuator that changes the seat-bottom motion controller from the deactivated configuration to the activated configuration when actuated.

3. A passenger support as defined in claim 1, wherein the seat-bottom motion controller includes a bias spring and a latch coupled to the seat bottom for pivotable movement about a latch pivot axis.

4. A passenger support as defined in claim 3, wherein the seat base includes a catch, the latch engages the catch to prevent the seat bottom from pivoting about a seat-bottom pivot axis when the seat-bottom motion controller is in the activated position, and the latch disengages the catch to allow the seat bottom to pivot about the seat-bottom pivot axis when the seat-bottom motion controller is in the activated position.

5. A passenger support as defined in claim 4, wherein the seat-bottom motion controller includes a cable extending between the latch and an actuator.

6. A passenger support as defined in claim 1, wherein the seat bottom includes a seat pan and a support leg coupled to the seat pan to pivot about a leg pivot axis between a support position extending away from the seat pan and a stored position extending along the seat pan.

7. A passenger support as defined in claim 6, wherein the seat-bottom motion controller includes a guide link coupled to the support leg and to the seat back, the guide link being configured to guide the support leg from the support position to the stored position when the seat bottom moves from the occupant-use position to the folded-up position.

8. A passenger support as defined in claim 1, wherein the seat back is coupled to the seat base for pivotable movement about a seat-back pivot axis between an occupant-use position and a tilted-forward position.

9. A passenger support as defined in claim 8, wherein the seat back forms an angle greater than or equal to about 90 degrees with the foundation frame when the seat back is in the occupant-use position, and the seat back forms an acute angle with the foundation frame when the seat back is in the tilted-forward position.

10. A passenger support as defined in claim 8, further comprising a seat-back motion controller having a deactivated configuration that prevents the seat back from pivoting about the seat-back pivot axis, and an activated configuration that allows the seat back to pivot about the seat-back pivot axis.

11. A passenger support as defined in claim 10, wherein the seat-back motion controller includes a return linkage configured to prevent the seat back from moving to the occupant-use position and configured to allow the seat back to move to the occupant-use position in response to the seat base moving along the foundation frame from the forward position to a full-return position.

12. A passenger support as defined in claim 11, wherein the return linkage comprises:
 a bracket coupled to the seat back and formed to include a notch;
 a hook formed to include a protrusion sized to be received in the notch and pivotably coupled to the seat base; and
 a rearward return blocker pivotably coupled to the seat base to selectively block or allow the protrusion of the hook to be moved out of the notch.

13. A passenger support as defined in claim 1, further comprising a seat-base motion controller having a deactivated configuration that prevents the seat base from moving along the foundation frame to the forward position and an activated configuration that allows the seat base to move along the foundation frame to the forward position.

14. A passenger support as defined in claim 13, wherein the seat-base motion controller is configured to change from the deactivated configuration to the activated configuration in response to seat back movement from the occupant-use position to the tilted-forward position.

15. A passenger support as defined in claim 14, wherein the seat-base motion controller comprises:
 a cam plate coupled to the seat back to pivot therewith about the seat-back pivot axis;
 a forward slide blocker pivotable between a lowered position that prevents the seat base from moving to the forward position and a raised position that allows the seat base to move to the forward position; and
 a cam follower pivotably coupled to the seat base and configured to push the forward slide blocker from the lowered position to the raised position in response to seat back movement from the occupant-use position to the tilted-forward position.

16. A passenger support as defined in claim 14, wherein the activated configuration of the seat-base motion controller prevents the seat base from moving along the foundation frame from the forward position past a full-return position when the seat back is in the tilted-forward position.

17. A passenger support as defined in claim 16, wherein the seat-base motion controller comprises:
 a cam plate coupled to the seat back to pivot therewith;
 a memory lever pivotable between a raised position that allows rearward movement of the seat base past the full-return position and a lowered position that prevents movement of the seat base past the full-return position; and
 a cam follower coupled to the memory lever by a spring and configured to move the memory lever to the lowered position when the seat back is in the tilted-forward position and the seat base is moved forward past the full-return position.

18. A passenger support, comprising:
 a foundation frame configured to be coupled to a vehicle;
 a vehicle seat, including: a seat base mounted to the foundation frame for movement between a rearward position and a forward position, a seat back extending from the seat base, and a seat bottom configured to move between an occupant-use position extending away from the seat back and a folded-up position along the seat back; and
 a seat-bottom motion controller having a deactivated configuration that prevents the seat bottom from moving from the occupant-use position to the folded-up position, and an activated configuration that allows the seat bottom to move from the occupant use position to the folded-up position,
 wherein the seat bottom includes a seat pan and a support leg coupled to the seat pan to pivot about a leg pivot axis between a support position extending away from the seat pan and a stored position extending along the seat pan.

19. A passenger support, comprising:
 a seat base mounted to a foundation frame for movement between a rearward position and a forward position;
 a seat back extending from the seat base and being moveable between an occupant-use position and a tilted-forward position;
 a seat bottom configured to move between an occupant-use position extending away from the seat back and a folded-up position along the seat back;
 a seat-bottom motion controller having a deactivated configuration that prevents the seat bottom from moving from the occupant-use position to the folded-up position and an activated configuration that allows the seat bottom to move from the occupant use position to the folded-up position; and a seat-base motion controller having a deactivated configuration that prevents the seat base from moving along the foundation frame to the forward position and an activated configuration that allows the seat base to move along the foundation frame to the forward position, wherein the seat-base motion controller comprises a cam plate pivotally coupled to the seat back, a forward slide blocker moveable between a first position that prevents the seat base from moving to the forward position and a second position that allows the seat base to move to the forward position, and a cam follower coupled to the seat base and configured to move the forward slide blocker from the first position to the second position in response to seat back movement from the occupant-use position to the tilted-forward position.

20. A passenger support as defined in claim 19, wherein the seat base has a front edge, the seat bottom has a front edge, and the front edge of the seat bottom is behind the front edge of the seat base in the folded-up position.

\* \* \* \* \*